US012426053B2

(12) United States Patent
Gao et al.

(10) Patent No.: US 12,426,053 B2
(45) Date of Patent: Sep. 23, 2025

(54) METHOD AND DEVICE FOR SCHEDULING TRANSMISSION

(71) Applicant: DATANG MOBILE COMMUNICATIONS EQUIPMENT CO., LTD., Beijing (CN)

(72) Inventors: Xueyuan Gao, Beijing (CN); Xin Su, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 804 days.

(21) Appl. No.: 17/636,015

(22) PCT Filed: Jun. 19, 2020

(86) PCT No.: PCT/CN2020/097113
§ 371 (c)(1),
(2) Date: Feb. 16, 2022

(87) PCT Pub. No.: WO2021/031678
PCT Pub. Date: Feb. 25, 2021

(65) Prior Publication Data
US 2022/0279565 A1 Sep. 1, 2022

(30) Foreign Application Priority Data
Aug. 16, 2019 (CN) .......................... 201910760411.3

(51) Int. Cl.
*H04W 72/23* (2023.01)
*H04L 1/00* (2006.01)
*H04W 72/54* (2023.01)

(52) U.S. Cl.
CPC .......... *H04W 72/23* (2023.01); *H04L 1/0006* (2013.01); *H04L 1/0017* (2013.01);
(Continued)

(58) Field of Classification Search
CPC .... H04W 72/23; H04W 72/54; H04L 1/0006; H04L 1/0017; H04L 1/0025;
(Continued)

(56) References Cited

U.S. PATENT DOCUMENTS 11,641,646 B2 * 5/2023 Bagheri ................ H04W 72/23
370/330
11,909,526 B2 * 2/2024 Yuan ...................... H04B 7/022
(Continued)

FOREIGN PATENT DOCUMENTS

CN 110022615 A 7/2019
WO 2019052484 A1 3/2019

OTHER PUBLICATIONS

Kddi, "Enhancements on Multi-TRP/panel transmission", 3GPP TSG RAN WG1 Meeting #97, Reno, USA, May 13-17, 2019, total 6 pages, R1-1907417.

(Continued)

*Primary Examiner* — Brian T O Connor
(74) *Attorney, Agent, or Firm* — KILPATRICK TOWNSEND & STOCKTON LLP

(57) ABSTRACT

Disclosed in embodiments of the present application are a method and device for scheduling transmission, which are used to solve the problem in which there are currently no solutions for transmission scheduling that supports various communication scenario changes. In the embodiments of the present application, a network side device sends a transmission instruction to a terminal device; and the terminal device determines a transmission scheduling mode according to the transmission instruction and performs transmission scheduling. Moreover, after determining that an adjustment condition is satisfied, the network side device determines a new transmission scheduling mode and notifies the terminal device, so that the terminal device performs transmission (Continued)

scheduling by means of the new transmission scheduling mode.

15 Claims, 6 Drawing Sheets

(52) U.S. Cl.
CPC .......... H04L 1/0025 (2013.01); H04L 1/0026 (2013.01); H04W 72/54 (2023.01)

(58) Field of Classification Search
CPC ... H04L 1/0026; H04L 1/0009; H04L 1/1819; H04L 5/0048; H04L 25/0204; H04L 5/001; H04L 5/0051; H04L 5/0094; H04L 5/0035; H04L 1/08; H04B 7/024
See application file for complete search history.

(56) References Cited

U.S. PATENT DOCUMENTS

| | | | | |
|---|---|---|---|---|
| 11,985,674 | B2* | 5/2024 | Chatterjee | H04W 72/0453 |
| 12,063,181 | B2* | 8/2024 | Gao | H04L 1/08 |
| 12,082,209 | B2* | 9/2024 | Hwang | H04L 27/26 |
| 12,200,724 | B2* | 1/2025 | Su | H04W 72/044 |
| 12,261,696 | B2* | 3/2025 | Gao | H04L 5/0048 |
| 12,302,311 | B2* | 5/2025 | Jung | H04B 7/024 |
| 2018/0054830 | A1 | 2/2018 | Luo et al. | |
| 2020/0015200 | A1* | 1/2020 | Vilaipornsawai | H04W 72/23 |
| 2020/0106559 | A1* | 4/2020 | Vilaipornsawai | H04L 1/1896 |
| 2022/0167389 | A1* | 5/2022 | Kim | H04L 5/0023 |
| 2022/0239448 | A1* | 7/2022 | Gao | H04L 1/0009 |
| 2022/0312440 | A1* | 9/2022 | Bagheri | H04W 72/044 |
| 2022/0345245 | A1* | 10/2022 | Yuan | H04L 5/0023 |

OTHER PUBLICATIONS

Ericsson, "Views on CSI framework for multi-TRP", 3GPP TSG RAN WG1 Meeting #97, Reno, USA, May 13-17, 2019, total 2 pages, R1-1907424.

Huawei et al., "Summary of AI: 7.2.8.2 Enhancements on Multi-TRP/Panel Transmission of Offline Discussion", 3GPP TSG RAN WG1 Meeting #97, Reno, USA, May 13-17, 2019, total 66 pages, R1-1907706.

NTT DOCOMO, Inc, "Enhancements on multi-TRP/panel transmission", 3GPP TSG RAN WG1 #97, Reno, USA, May 13-17, 2019, total 32 pages, R1-1906224.

Qualcomm Incorporated, "Multi-TRP Enhancements", 3GPP TSG-RAN WG1 Meeting #97, May 13-17, 2019, Reno, Nevada, USA, total 25 pages, R1-1907289.

Nokia et al., "Enhancements on Multi TRP/ Panel Transmission", 3GPP TSG RAN WG1 #97 Meeting, Reno, USA, May 13-May 17, 2019, total 21 pages, R1-1907316.

* cited by examiner

METHOD AND DEVICE FOR SCHEDULING TRANSMISSION

CROSS REFERENCE TO RELATED APPLICATIONS

The present application is a National Stage of International Application No. PCT/CN2020/097113, filed on Jun. 19, 2020, which claims priority to the Chinese Patent Application No. 201910760411.3, filed to the China Patent Office on Aug. 16, 2019 and entitled "METHOD AND DEVICE FOR SCHEDULING TRANSMISSION", the entire contents of which are incorporated herein by reference.

FIELD

The present application relates to the field of wireless transmission, in particular to a method and device for transmission scheduling.

BACKGROUND

At present, in a communication process, in order to improve cell edge coverage, provide a more balanced quality of service in a service zone and guarantee transmission performance, a transmission technology of multiple transmission reception points (TRPs)/transmitting and receiving antenna panels is frequently used. A communication method based on the transmission technology of the multiple TRPs/Panels in the related art may be generally divided into the following several types: transmission of a single TRP, transmission of a single redundancy version (RV) of the multiple TRPs and multi-RV transmission of a single TRP.

The single-RV transmission mode is low in coding rate and high in coding gain, its specific transmission flow may be shown in FIG. 1, namely, different layers of data of the same transport block (TB) are transmitted at the same time through the different TRPs and are mapped onto the same time-frequency resource or different time-frequency resources which do not overlap with each other. As for the multi-RV transmission mode, data transmitted on each TRP may be decoded independently or in a merged manner, the coding rate is high, and its specific transmission flow may be shown in FIG. 2, namely, the different RVs of the same TB are independently transmitted through the different TRPs and mapped onto the same time-frequency resource or different frequency domain resources which do not overlap with each other.

In the communication process at present, especially, a requirement for the quality of service (QOS) of an ultra-reliable low latency communication (URLLC) service is quite high. In a scenario of sending by a multi-TRP/Panel base station, there is a significant problem that channel fading conditions of each TRP/Panel reaching certain UE may differ greatly, which seems more prominent with substantial decreasing of a wavelength in a case of a high frequency, and channel fading and blocking may make a certain TRP be seriously reduced in its transmission quality and even fail in normal transmission. Therefore, a more effective transmission scheduling strategy is needed to support various scenario changes to guarantee transmission performance and reliability, but there is no relevant solution at present.

To sum up, there is no transmission scheduling method for supporting various communication scenario changes at present.

SUMMARY

Embodiments of the present application provide a method and device for transmission scheduling in order to solve the problem that there is no transmission scheduling solution for supporting various communication scenario changes at present.

In a first aspect, a method for transmission scheduling provided by an embodiment of the present application includes: determining, by a terminal device, a transmission scheduling mode according to a received transmission instruction sent by a network device, and performing transmission scheduling in the determined transmission scheduling mode, wherein the number of TRPs/Panels in the transmission scheduling mode is determined according to TRP indication information in the transmission instruction, and the number of RVs in the transmission scheduling mode is determined according to RV indication information in the transmission instruction; and determining, by the terminal device, a new transmission scheduling mode according to a received adjusted transmission instruction sent by the network device, and performing transmission scheduling in the new transmission scheduling mode.

In the above method, during transmission scheduling, the network device can adjust an adaptive transmission scheduling mode after determining that the current transmission scheduling mode meets an adjustment condition according to an actual transmission condition, and notify the terminal device so that the terminal device can switch the current transmission scheduling mode into the transmission scheduling mode adjusted by the network device, and perform transmission scheduling in the adjusted transmission scheduling mode, thus transmission performance and reliability of a system are better guaranteed, and dynamic switching of various transmission modes is realized.

In a possible implementation, the terminal device determines the number of TRPs and/or the number of Panels in the following manner: in a case that the TRP indication information in the transmission instruction contains a transmission control information (TCI) state, the terminal device determines the number of TCI states contained in the TRP indication information as the number of TRPs and/or the number of Panels for transmission scheduling; or in a case that the TRP indication information in the transmission instruction contains a TCI identification code, the terminal device determines the number of TCI states corresponding to the TCI identification code according to a preset mapping relationship between TCI identification codes and TCI states and determines the number of TCI states corresponding to the TCI identification code as the number of TRPs and/or the number of Panels for transmission scheduling.

In the above method, various manners are provided for determining, through the transmission instruction, the number of TRPs used for transmission scheduling. For example, the terminal device determines the number of TCI states to which the TCI identification code corresponds according to the preset mapping relationship between TCI identification codes and TCI states, and determines the number of TCI states to which the TCI identification code corresponds as the number of TRPs.

In a possible implementation, the method further includes: determining, by the terminal device, a TRP corresponding to the TCI state contained in the TRP indication information, and determining the TRP as a TRP used for transmission scheduling; or determining, by the terminal device, a TRP corresponding to a TCI state according to the TCI identification code contained in the TRP indication information, and determining the TRP as a TRP used for transmission scheduling.

In the above method, various manners are provided for determining, through the transmission instruction, the TRP used for transmission scheduling. For example, the terminal device determines the TRP to which the TCI state corresponds according to the TCI identification code contained in the TRP indication information, and determines the TRP as the TRP used for transmission scheduling.

In a possible implementation, the terminal device determines the number of RVs in the following manner: in a case that the RV indication information in the transmission instruction contains an RV, the terminal device determines the number of RVs contained in the RV indication information as the number of RVs for transmission scheduling; or in a case that the RV indication information in the transmission instruction contains an RV identification code, the terminal device determines the number of RVs corresponding to the RV identification code according to a preset mapping relationship between RV identification codes and RVs, and determines the number of RVs corresponding to the RV identification code as the number of RVs for transmission scheduling; or in a case that the RV indication information in the transmission instruction contains an RV and RV offset information, the terminal device determines the number of RVs according to the RV and the RV offset information, and determines the determined number of RVs as the number of RVs of transmission scheduling.

In the above method, various manners are provided for determining, through the transmission instruction, the number of RVs used for transmission scheduling. For example, the terminal device determines the number of RVs to which the RV identification code corresponds according to the preset mapping relationship between RV identification codes and RVs, and determines the number of TCI states to which the TCI identification code corresponds as the number of TRPs. In one embodiment, for example, the terminal device determines the number of RVs according to the RV and the RV offset information contained in the RV indication information in the transmission instruction.

In a possible implementation, the method further includes: determining, by the terminal device, an RV contained in the RV indication information, and determining the RV as an RV used for transmission scheduling; or determining, by the terminal device, an RV determined through an RV identification code contained in the RV indication information as an RV used for transmission scheduling.

In the above method, various manners are provided for determining, through the transmission instruction, the RV used for transmission scheduling. For example, the terminal device determines the corresponding RV according to the RV identification code contained in the RV indication information, and determines the RV as the RV used for transmission scheduling.

In a possible implementation, the determining, by the terminal device, the number of RVs for transmission scheduling according to the RV and the RV offset information contained in the transmission instruction, includes: determining, by the terminal device, the number of effective RV offset information in the RV offset information contained in the transmission instruction according to an effective offset range; and determining, by the terminal device, a sum of the number of RVs and the number of effective RV offset information contained in the transmission instruction as the number of RVs for transmission scheduling.

In the above method, a manner for determining the number of RVs through the sum of the number of RVs and the number of effective RV offset information contained in the transmission instruction is provided.

In a possible implementation, the method further includes: determining, by the terminal device, an RV according to the effective RV offset information; and determining, by the terminal device, the determined RV and the RV contained in the RV indication information as RVs used for transmission scheduling.

In a possible implementation, determining, by the terminal device, a new transmission scheduling mode according to a received reset transmission instruction sent by the network device, includes: determining, by the terminal device, the new number of TRPs and/or the new number of Panels according to TRP indication information in the reset transmission instruction in a case that the reset transmission instruction includes the TRP indication information, and determining the new transmission scheduling mode according to the new number of TRPs and/or the new number of Panels and the current number of RVs; or determining, by the terminal device, the new number of RVs according to RV indication information in the reset transmission instruction in a case that the reset transmission instruction includes the RV indication information, and determining the new transmission scheduling mode according to the current number of TRPs and/or the current number of Panels and the new number of RVs; or determining, by the terminal device, the new number of RVs according to the RV indication information in the reset transmission instruction, determining the new number of TRPs and/or the new number of Panels according to the TRP indication information in the reset transmission instruction in a case that the reset transmission instruction includes the RV indication information and the TRP indication information, and determining the new transmission scheduling mode according to the new number of TRPs and/or the new number of Panels and the new number of RVs.

In the above method, the terminal device may determine the new number of RVs and/or the new number of TRPs according to the adjusted transmission instruction, and determines the new transmission scheduling mode.

In a possible implementation, before determining, by the terminal device, the new transmission scheduling mode according to a received reset transmission instruction sent by the network device, the method further includes: feeding, by the terminal device, transmission quality information back to the network device in a scheduling process to enable the network device to send the reset transmission instruction to the terminal device after the network device determines that the received transmission quality information meets a resetting condition.

In the above method, the terminal device feeds the transmission quality information back to the network device so that the network device can send the reset transmission instruction to the terminal device after determining that the received transmission quality information meets the resetting condition.

In a second aspect, a method for transmission scheduling provided by an embodiment of the present application includes: determining, by a network device, a transmission scheduling mode for transmission scheduling, and sending a transmission instruction indicating the transmission scheduling mode to a terminal device, wherein the transmission instruction includes TRP indication information used for determining the number of TRPs and/or the number of Panels in the transmission scheduling mode and RV indication information used for determining the number of RVs in the transmission scheduling mode; and determining, by the network device, a new transmission scheduling mode after determining that the transmission scheduling mode meets an adjustment condition, and sending, by the network device, an adjusted transmission instruction to the terminal device to enable the terminal device to determine the new transmission scheduling mode according to the adjusted transmission instruction and perform transmission scheduling in the new transmission scheduling mode.

In the above method, during transmission scheduling, the network device can adjust an adaptive transmission scheduling mode after determining that the current transmission scheduling mode meets the adjustment condition according to an actual transmission condition, and notify the terminal device so that the terminal device can switch the current transmission scheduling mode to the transmission scheduling mode adjusted by the network device, and perform transmission scheduling in the adjusted transmission scheduling mode, thus transmission performance and reliability of a system are better guaranteed, and dynamic switching of various transmission modes is realized.

In a possible implementation, the network device determines a TRP in the following manner: the network device determines a TRP used by the transmission scheduling mode, and puts a TCI state corresponding to the TRP in the TRP indication information; or the network device determines a TCI identification code corresponding to a TRP used by the transmission scheduling mode according to a preset mapping relationship between TCI identification codes and TCI states, and puts the TCI identification code in the TRP indication information.

In the above method, various manners are provided for determining, by the network device, the TRP. For example, the network device determines the TCI identification code to which the TRP used by the transmission scheduling mode corresponds according to the preset mapping relationship between the TCI identification codes and the TCI states, and puts the TCI identification code in the TRP indication information.

In a possible implementation, the network device determines an RV in the following manner: the network device determines an RV used by the transmission scheduling mode, and puts the RV in the RV indication information; or the network device determines an RV identification code corresponding to an RV used by the transmission scheduling mode according to a preset mapping relationship between RV identification codes and RVs, and puts the RV identification code in the RV indication information; or the network device determines RV offset information corresponding to an RV used by the transmission scheduling mode according to a preset RV offset function, and puts the RV offset information in the RV indication information.

In the above method, various manners are provided for determining, by the network device, the RV. For example, the network device determines an RV identification code to which the RV used by the transmission scheduling mode corresponds according to the preset mapping relationship between RV identification codes and RVs, and puts the RV identification code in the RV indication information.

In a possible implementation, the network device determines the RV offset information in the following manner: the network device determines effectiveness of the RV offset information needing to be sent to the terminal device; the network device determines the RV offset information in an ineffective range in a case that the network device determines that the RV offset information is ineffective; or the network device determines the RV offset information in an effective range in a case that the network device determines that the RV offset information is effective.

In the above method, a manner for calculating the RV through the RV offset information is provided.

In a possible implementation, the network device determines whether the transmission scheduling mode meets the adjustment condition in the following manner: the network device determines that the transmission scheduling mode meets the adjustment condition in a case that transmission quality fed back by the terminal device during transmission scheduling and received by the network device is smaller than a first threshold value or larger than a second threshold value, wherein the first threshold value is smaller than the second threshold value.

The above method describes in detail a manner for judging, by the network device, whether the current transmission scheduling mode meets the adjustment condition.

In a possible implementation, the determining, by the network device, the new transmission scheduling mode after determining that the transmission scheduling mode meets the adjustment condition, includes: adjusting, by the network device, the number of RVs and/or the number of TRPs after determining that the transmission scheduling mode meets the adjustment condition; and determining, by the network device, the new transmission scheduling mode according to the adjusted number of RVs and/or the adjusted number of TRPs.

In the above method, the network device may determine the new transmission scheduling mode through the adjusted number of RVs and/or the adjusted number of TRPs.

In a possible implementation, the adjusting, by the network device, the number of RVs and/or the number of TRPs, includes: increasing the number of RVs and/or the number of TRPs of transmission scheduling in a case that the network device determines that the transmission quality is lower than the first threshold value; or decreasing the number of RVs and/or the number of TRPs of transmission scheduling in a case that the network device determines that the transmission quality is higher than the second threshold value.

In a possible implementation, the determining, by the network device, the new transmission scheduling mode according to the adjusted number of RVs and/or the adjusted number of TRPs, includes: determining, by the network device, the new transmission scheduling mode according to the adjusted number of RVs and the current number of TRPs in a case that the number of RVs is adjusted; or determining, by the network device, the new transmission scheduling mode according to the adjusted number of TRPs and the current number of RVs in a case that the number of TRPs is adjusted; or determining, by the network device, the new transmission scheduling mode according to the adjusted number of TRPs and the adjusted number of RVs in a case that the number of TRPs and the number of RVs are adjusted.

In a possible implementation, the sending, by the network device, the adjusted transmission instruction to the terminal device, includes: putting, by the network device, adjusted RV indication information corresponding to the adjusted number of RVs in the adjusted transmission instruction in a case that the number of RVs is adjusted; or putting, by the network device, adjusted TRP indication information corresponding to the adjusted number of TRPs in the adjusted transmission instruction in a case that the number of TRPs is adjusted; or putting, by the network device, adjusted RV indication information corresponding to the adjusted number of RVs and adjusted TRP indication information corresponding to the adjusted number of TRPs in the adjusted transmission instruction in a case that the number of TRPs and the number of RVs are adjusted.

In a third aspect, an embodiment of the present application provides a terminal device for transmission scheduling, including: a processor and a memory.

The processor is configured to determine a transmission scheduling mode according to a received transmission instruction sent by a network device and perform transmission scheduling in the determined transmission scheduling mode, wherein the number of TRPs in the transmission scheduling mode is determined according to TRP indication information in the transmission instruction, and the number of RVs in the transmission scheduling mode is determined according to RV indication information in the transmission instruction; and determine a new transmission scheduling mode according to a received adjusted transmission instruction sent by the network device and perform transmission scheduling in the new transmission scheduling mode.

In a fourth aspect, an embodiment of the present application provides a network device for transmission scheduling, including: a processor and a memory.

The processor is configured to determine a transmission scheduling mode for transmission scheduling and send a transmission instruction indicating the transmission scheduling mode to a terminal device, wherein the transmission instruction includes TRP indication information used for determining the number of TRPs in the transmission scheduling mode and RV indication information used for determining the number of RVs in the transmission scheduling mode; and determine a new transmission scheduling mode after determining that the transmission scheduling mode meets an adjustment condition and send an adjusted transmission instruction to the terminal device to enable the terminal device to determine the new transmission scheduling mode according to the adjusted transmission instruction and perform transmission scheduling in the new transmission scheduling mode.

In a fifth aspect, an embodiment of the present application further provides a terminal device for transmission scheduling, including: at least one processing unit and at least one storage unit, wherein the storage unit stores program codes, and when the program codes are executed by the processing unit, the processing unit executes the above first aspect and any possible designed method mentioned in the first aspect.

In a sixth aspect, an embodiment of the present application further provides a network device for transmission scheduling, including: at least one processing unit and at least one storage unit, wherein the storage unit stores program codes, and when the program codes are executed by the processing unit, the processing unit executes the above second aspect and any possible designed method mentioned in the second aspect.

In a seventh aspect, an embodiment of the present application further provides a terminal device for transmission scheduling, including: a determining module, configured to determine a transmission scheduling mode according to a received transmission instruction sent by a network device and perform transmission scheduling in the determined transmission scheduling mode, wherein the number of TRPs and/or the number of Panels in the transmission scheduling mode are/is determined according to TRP indication information in the transmission instruction, and the number of RVs in the transmission scheduling mode is determined according to RV indication information in the transmission instruction; and a processing module, configured to determine a new transmission scheduling mode according to a received adjusted transmission instruction sent by the network device and perform transmission scheduling in the new transmission scheduling mode.

In a possible implementation, the determining module determines the number of TRPs in the following manner: in a case that the TRP indication information in the transmission instruction includes a TCI state, the number of TCI states contained in the TRP indication information is determined as the number of TRPs and/or the number of Panels for transmission scheduling; or in a case that the TRP indication information in the transmission instruction includes a TCI identification code, the number of TCI states corresponding to the TCI identification code is determined according to a preset mapping relationship between TCI identification codes and TCI states, and the number of TCI states corresponding to the TCI identification code is determined as the number of TRPs for transmission scheduling.

In a possible implementation, the processing module is further configured to: determine a TRP corresponding to the TCI state contained in the TRP indication information and determine the TRP as a TRP used for transmission scheduling; or determine the TRP corresponding to the TCI state according to the TCI identification codes contained in the TRP indication information, and determine the TRP as the TRP used for transmission scheduling.

In a possible implementation, the determining module determines the number of RVs in the following manner: in a case that the RV indication information in the transmission instruction contains an RV, determining the number of RVs contained in the RV indication information as the number of RVs for transmission scheduling; or in a case that the RV indication information in the transmission instruction contains an RV identification code, determining the number of RVs corresponding to the RV identification code according to a preset mapping relationship between RV identification codes and RVs, and determining the number of RVs corresponding to the RV identification code as the number of RVs for transmission scheduling; or in a case that the RV indication information in the transmission instruction contains an RV and RV offset information, the terminal device determines the number of RVs according to the RV and the RV offset information and determines the determined number of RVs serve as the number of RVs for transmission scheduling.

In a possible implementation, the determining module is further configured to: determine an RV contained in the RV indication information and determine the RV as an RV used for transmission scheduling; or determine an RV determined through an RV identification code contained in the RV indication information as an RV used for transmission scheduling.

In a possible implementation, the determining module is further configured to: determine the number of effective RV offset information in the RV offset information contained in the transmission instruction according to an effective offset range; and determine a sum of the number of RVs and the number of effective RV offset information contained in the transmission instruction as the number of RVs for transmission scheduling.

In a possible implementation, the determining module is further configured to: determine an RV according to the effective RV offset information; and determine the determined RV and the RV contained in the RV indication information as RVs used for transmission scheduling.

In a possible implementation, the processing module is further configured to: determine the new number of TRPs and/or the new number of Panels according to TRP indication information in a reset transmission instruction in a case that the reset transmission instruction includes the TRP indication information, and determine the new transmission scheduling mode according to the new number of TRPs and/or the new number of Panels and the current number of RVs; or determine the new number of RVs according to the RV indication information in the reset transmission instruction in a case that the reset transmission instruction includes the RV indication information, and determine the new transmission scheduling mode according to the current number of TRPs and/or the current number of Panels and the new number of RVs; or determine the new number of RVs according to the RV indication information in the reset transmission instruction and determine the new number of TRPs and/or the new number of Panels according to the TRP indication information in the reset transmission instruction in a case that the reset transmission instruction includes the RV indication information and the TRP indication information, and determine the new transmission scheduling mode according to the new number of TRPs and/or the new number of Panels and the new number of RVs.

In a possible implementation, the processing module is further configured to: feed transmission quality information back to the network device in a scheduling process to enable the network device to send the reset transmission instruction to the terminal device after the network device determines that the received transmission quality information meets a resetting condition.

In an eighth aspect, an embodiment of the present application further provides a network device for transmission scheduling, including: a sending module, configured to determine a transmission scheduling mode for transmission scheduling and send a transmission instruction indicating the transmission scheduling mode to a terminal device, wherein the transmission instruction includes TRP indication information used for determining the number of TRPs and/or the number of Panels in the transmission scheduling mode and RV indication information used for determining the number of RVs in the transmission scheduling mode; and a processing module, configured to determine a new transmission scheduling mode after determining that the transmission scheduling mode meets an adjustment condition and send an adjusted transmission instruction to the terminal device to enable the terminal device to determine the new transmission scheduling mode according to the adjusted transmission instruction and perform transmission scheduling in the new transmission scheduling mode.

In a possible implementation, the processing module determines a TRP in the following manner: determining a TRP used by the transmission scheduling mode, and putting a TCI state corresponding to the TRP in the TRP indication information; or determining a TCI identification code corresponding to a TRP used by the transmission scheduling mode according to a preset mapping relationship between TCI identification codes and TCI states, and putting the TCI identification code in the TRP indication information.

In a possible implementation, the processing module determines an RV in the following manner: determining an RV used by the transmission scheduling mode and putting the RV in the RV indication information; or determining an RV identification code corresponding to an RV used by the transmission scheduling mode according to a preset mapping relationship between RV identification codes and RVs and putting the RV identification code in the RV indication information; or determining RV offset information corresponding to an RV used by the transmission scheduling mode according to a preset RV offset function and putting the RV offset information in the RV indication information.

In a possible implementation, the processing module determines the RV offset information in the following manner: determining effectiveness of the RV offset information needing to be sent to the terminal device; determining the RV offset information in an ineffective range in a case that the RV offset information is ineffective; or determining the RV offset information in an effective range in a case that the RV offset information is effective.

In a possible implementation, the processing module determines whether the transmission scheduling mode meets the adjustment condition in the following manner: determining that the transmission scheduling mode meets the adjustment condition in a case that received transmission quality fed back by the terminal device during transmission scheduling is smaller than a first threshold value or larger than a second threshold value, wherein the first threshold value is smaller than the second threshold value.

In a possible implementation, the processing module is further configured to: adjust the number of RVs and/or the number of TRPs after determining that the transmission scheduling mode meets the adjustment condition; and determine the new transmission scheduling mode according to the adjusted number of RVs and/or the adjusted number of TRPs.

In a possible implementation, the processing module is further configured to: increase the number of RVs and/or the number of TRPs of transmission scheduling in a case that the transmission quality is lower than the first threshold value; or decrease the number of RVs and/or the number of TRPs of transmission scheduling in a case that that the transmission quality is higher than the second threshold value.

In a possible implementation, the processing module is further configured to: determine the new transmission scheduling mode according to the adjusted number of RVs and the current number of TRPs in a case that the number of RVs is adjusted; or determine the new transmission scheduling mode according to the adjusted number of TRPs and the current number of RVs in a case that the number of TRPs is adjusted; or determine the new transmission scheduling mode according to the adjusted number of TRPs and the adjusted number of RVs in a case that the number of TRPs and the number of RVs are adjusted.

In a possible implementation, the processing module is further configured to: put adjusted RV indication information corresponding to the adjusted number of RVs in the adjusted transmission instruction in a case that the number of RVs is adjusted; or put adjusted TRP indication information corresponding to the adjusted number of TRPs in the adjusted transmission instruction in a case that the number of TRPs is adjusted; or put adjusted RV indication information corresponding to the adjusted number of RVs and adjusted TRP indication information corresponding to the adjusted number of TRPs in the adjusted transmission instruction in a case that the number of TRPs and the number of RVs are adjusted.

In a ninth aspect, the present application further provides a computer storage medium storing computer programs, and when the programs are executed by a processor, the first aspect and any possible designed method mentioned in the first aspect are realized.

In a tenth aspect, the present application further provides a computer storage medium storing computer programs, and when the programs are executed by a processor, the second aspect and any possible designed method mentioned in the second aspect are realized.

In an eleventh aspect, the present application further provides a computer program product, and when the computer program product runs on an electronic device, the electronic device executes and realizes the above aspects and any possible designed method mentioned in the aspects of the embodiments of the present application.

Besides, the effects brought by any implementation in the second aspect to the eleventh aspect may refer to the effects brought by the different implementations in the first aspect and the second aspect and will not be repeated here.

BRIEF DESCRIPTION OF THE DRAWINGS

In order to describe the embodiments of the present application more clearly, accompanying drawings needed in description of the embodiments will be briefly introduced below, apparently, the drawings in the following description are only some of the embodiments of the present application.

DETAILED DESCRIPTION OF THE EMBODIMENTS

Figure 1:
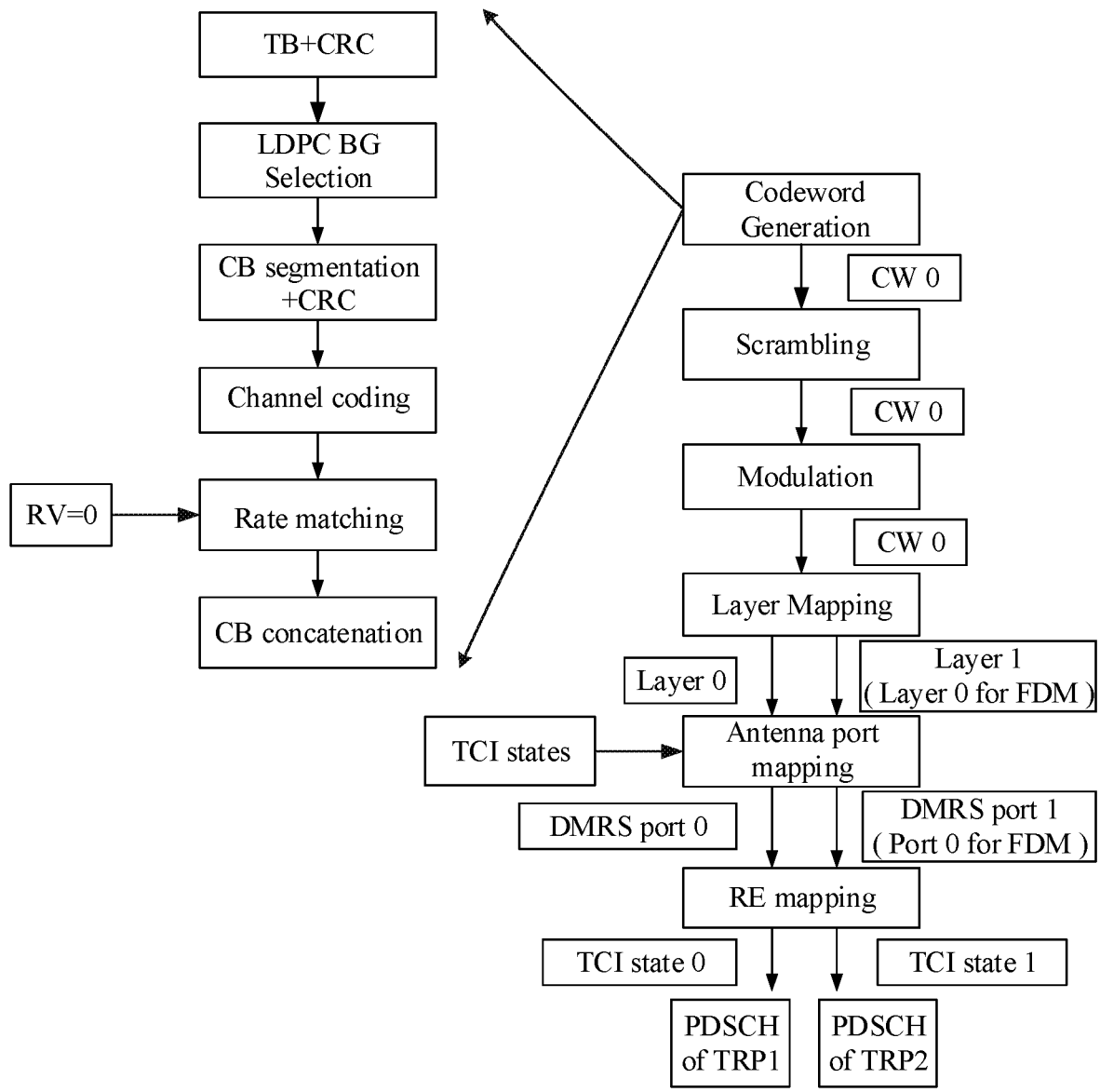
FIG. 1 is a schematic flowchart of a single-RV transmission mode in a communication process.
Figure 2:
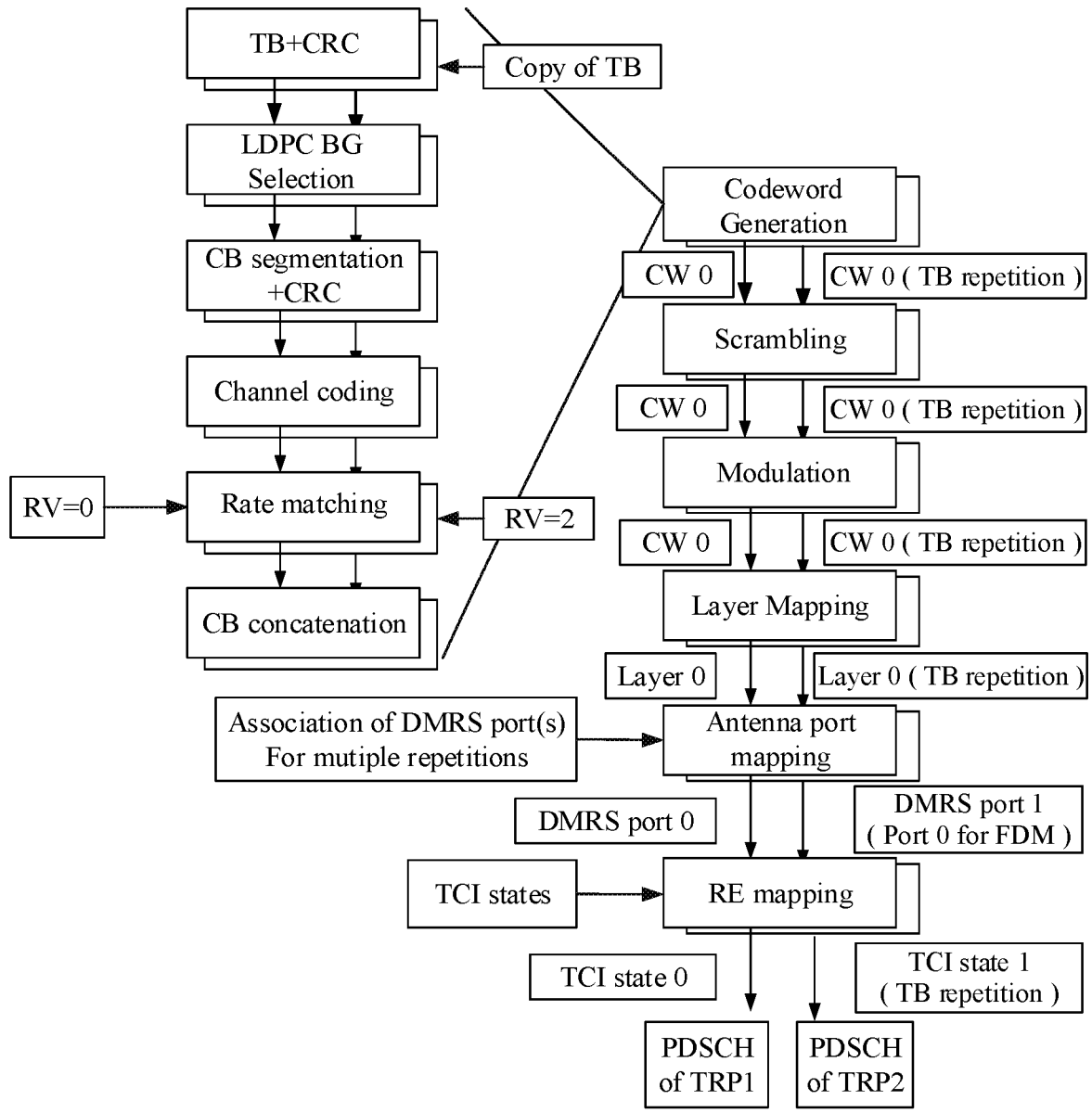
FIG. 2 is a schematic flowchart of a multi-RV transmission mode in a communication process.

In order to make the embodiments of the present application clearer, the embodiments of the present application will be further described in detail below with reference to the drawings, the described embodiments are only some but not all of the embodiments of the present application.

Some words occurring herein are explained below.

(1) a term "a plurality of" in the embodiments of the present application refers to two or more, and other measure words are similar to this.

(2) "And/or" describes an associated relation of associated objects and represents that there may be three types of relations, for example, A and/or B may represent that only A exists, A and B exist at the same time, and only B exists. A character "/" generally represents that front and back associated objects have an 'or' relation.

(3) "RV" in the embodiments of the present application is used for realizing incremental redundancy hybrid automatic repeat request (HARQ) transmission, namely, redundant bits generated by an encoder are divided into several groups, a transmission start point is defined for each RV, initial transmission and each time of HARQ retransmission use different RVs respectively, thus stepwise accumulation of the redundant bits is realized, and incremental redundancy HARQ operation is completed.

(4) "URLLC" in the embodiments of the present application refers to one type of definitions of a scene of a 5G era, which is widely recognized by the industry field that it may be applied to scenes such as industrial control, factory automation, a smart grid, a device, Internet of Vehicles communication and telesurgery.

(5) "Space division multiplexing (SDM)" in the embodiments of the present application refers to a multiplexing method for forming different channels by using space division.

(6) "Frequency division multiplexing (FDM)" in the embodiments of the present application refers to using different frequencies to transmit all channels of information to realize multi-channel communication. In the frequency division multiplexing mode, data of each channel are transmitted in parallel, a transmission line can transmit different pieces of information on each channel at the same time, and if a user with a sub-channel distributed thereto does not have data for transmission, the sub-channel stays idle.

At present, a communication method based on the transmission technology of multiple TRPs/Panels in the related art may be generally divided into transmission of a single TRP, single-RV multi-TRP transmission and single-TRP multi-RV transmission. For example, in the SDM mode, different layers of data of the same TB may be transmitted at the same time through the different TRPs by using the single-RV transmission and are mapped onto the same time-frequency resource; and different RVs of the same TB may be transmitted independently through the different TRPs by using the multi-RV transmission mode and are mapped onto the same time-frequency resource. For another example, in the FDM mode, the data of the same TB may be transmitted at the same time through the different TRPs by using the single-RV transmission and are mapped onto different frequency domain resources which do not overlap with each other; and the different RVs of one TB may be transmitted independently through the different TRPs by using the multi-RV transmission and are mapped onto the different frequency domain resources which do not overlap with each other. The larger the number of RVs and/or the number of TRPs are/is, the higher the coding rate gets, the further the transmission performance and the security can be guaranteed, however, there are more occupied system resources relatively. The smaller the number of RVs and/or the number of TRPs are/is, the less the system resources will be, however, the coding rate gets lower relatively.

At present, in a communication process, especially, a requirement for QoS of a URLLC service is quite high, which requires not only to guarantee transmission stability and security in a transmission scheduling process, but also to avoid occupying of too many resources, increases system overhead and affects other processes. Therefore, a more effective transmission scheduling strategy is need in the communication scheduling process for adjusting a transmission scheduling mode in time according to different cases, but there is no relevant solution at present. Meanwhile, there is no mode of communication through the multiple TRPs and the multiple RVs provided in the related art.

Figure 3:
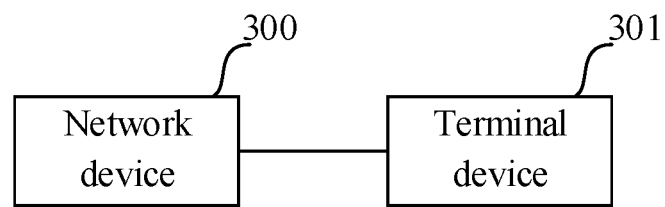
FIG. 3 is a schematic diagram of a system for transmission scheduling of an embodiment of the present application.

Therefore, as shown in FIG. 3, an embodiment of the present application provides a system for transmission scheduling, including a network device 300 and a terminal device 301.

The network device 300 is configured to determine a transmission scheduling mode for transmission scheduling and send, to a terminal device, a transmission instruction used for indicating the transmission scheduling mode, wherein the transmission instruction includes TRP indication information used for determining the number of TRPs and/or the number of Panels in the transmission scheduling mode and RV indication information used for determining the number of RVs in the transmission scheduling mode; determine a new transmission scheduling mode after determining that the current transmission scheduling mode meets an adjustment condition and send an adjusted transmission instruction to the terminal device so that the terminal device can determine the new transmission scheduling mode according to the adjusted transmission instruction and perform transmission scheduling in the new transmission scheduling mode.

The terminal device 301 is configured to determine the transmission scheduling mode according to the received transmission instruction sent by the network device and perform transmission scheduling in the determined transmission scheduling mode, wherein the number of TRPs and/or the number of Panels in the transmission scheduling mode are/is determined according to the TRP indication information in the transmission instruction, and the number of RVs in the transmission scheduling mode is determined according to the RV indication information in the transmission instruction; determine the new transmission scheduling mode according to the received adjusted transmission instruction sent by the network device and perform transmission scheduling in the new transmission scheduling mode.

In the embodiments of the present application, the number of TRPs and/or the number of Panels may be determined through the TRP indication information. For the sake of convenient description, a case of determining the number of TRPs through the TRP indication information is selected subsequently for introduction, and a case of determining the number of Panels through the TRP indication information is similar to the case of determining the number of TRPs through the TRP indication information and will not be repeated here.

Through the above method, during transmission scheduling, the network device may adjust an adaptive transmission scheduling mode after determining that the current transmission scheduling mode meets the adjustment condition according to an actual transmission condition and notifies the terminal device so that the terminal device can switch the current transmission scheduling mode to the transmission scheduling mode adjusted by the network device and perform transmission scheduling in the adjusted transmission scheduling mode, thus transmission performance and reliability of the system are better guaranteed, and dynamic switching of various transmission modes is realized.

During transmission scheduling, the network device determines the transmission scheduling mode, and TRPs and RVs used for transmission scheduling and sends, to the terminal device, the transmission instruction used for indicating the transmission scheduling mode. The terminal device determines the TRPs used for transmission scheduling and the number of TRPs, and the RVs used for transmission scheduling and the number of RVs mainly according to the transmission instruction sent by the network device to determine the transmission scheduling mode, and the TRPs and the RVs used for transmission scheduling.

In the related art, the transmission instruction generally contains TCI states to which TRPs correspond and RVs, so the terminal device may determine the corresponding TRPs according to the TCI states in the transmission instruction after receiving the transmission instruction, make the determined TRPs serve as the TRPs used for transmission scheduling, and make the RVs in the transmission instruction serve as the RVs used for transmission scheduling.

For example, if the transmission instruction contains two TCI states, namely, a TCI state 1 and a TCI state 2, and one RV, wherein the RV is RV1, then the terminal device may determine the transmission scheduling mode as multi-TRP single-RV transmission according to information in the transmission instruction. Meanwhile, the terminal device may determine the corresponding TRPs as TRP 1 and TRP 2 according to the TCI state 1 and the TCI state 2, then the terminal device makes TRP 1 and TRP 2 serve as the TRPs used for transmission scheduling and makes RV1 serve as the RV used for transmission scheduling.

In one embodiment, for example, if the transmission instruction contains one TCI state and one RV, wherein the TCI state is the TCI state 1 and the RV is RV 1. Then the terminal device may determine the transmission scheduling mode as single-TRP transmission according to the information in the transmission instruction. Meanwhile, the terminal device may determine the corresponding TRP as TRP 1 according to the TCI state 1, and then the terminal device makes the TRP 1 serve as the TRP used for transmission scheduling and makes the RV 1 serve as the RV used for transmission scheduling.

In one embodiment, for example, if the transmission instruction contains a single TCI state and two RVs, wherein the TCI state is the TCI state 1 and the two RVs are RV 1 and RV 2 respectively. The terminal device may determine the transmission scheduling mode as single-TRP multi-RV transmission according to the information in the transmission instruction. Meanwhile, the terminal device may determine the corresponding TRP as TRP 1 according to the TCI state 1, and then the terminal device makes TRP 1 serve as the TRP used for transmission scheduling and makes RV 1 and RV 2 serve as the RVs used for transmission scheduling.

Furthermore, the transmission instruction in the embodiments of the present application does not necessarily contain an RV and may contain an RV identification code to which the RV corresponds. Likewise, the transmission instruction may not contain a TCI state and may contain a TCI identification code to which the TCI state corresponds. The TCI identification code to which the TCI state corresponds is determined according to a preset mapping relationship between TCI identification codes and TCI states of the network device, and the RV identification code to which the RV corresponds is determined according to a preset mapping relationship between RV identification codes and RVs of the network device.

In one embodiment, in the embodiments of the present application, the transmission instruction contains the TRP indication information and/or the RV indication information. The TRP indication information may contain one or more TCI states and/or one or more TCI identification codes, and the RV indication information may contain one or more RVs and/or one or more RV identification codes.

In one embodiment, the TRP identification code may be the TRP indication information (namely, a TRP code point), and the RV identification code may be an RV code point.

In one embodiment, the transmission instruction in the embodiments of the present application may further contain the RV and RV offset information.

The network device in the embodiments of the present application may set the TRP indication information in various manners which specifically include but are not limited to the following several types.

Setting manner 1: the network device determines the TRP used by the transmission scheduling mode and puts the TCI state to which the TRP corresponds in the TRP indication information, namely, the TRP indication information contains the TCI state to which the TRP corresponds.

Therefore, the terminal device may determine the number of TRPs used for transmission scheduling according to the number of TCI states in the TRP indication information after receiving the TRP indication information in the transmission instruction and may further determine the corresponding TRP according to the TCI state and make the determined TRP serve as the TRP used for transmission scheduling.

Setting manner 2: the network device determines the TCI identification code to which the TRP used by the transmission scheduling mode corresponds according to the preset mapping relationship between TCI identification codes and TCI states and puts the determined TCI identification code in the TRP indication information. Namely, the TRP indication information contains the TCI identification code.

Therefore, the terminal device may determine the TCI state to which the TCI identification codes correspond and the number of TCI states according to the TCI identification code in the TRP indication information and a preset mapping relationship between TCI identification codes and TCI states of the terminal device after receiving the TRP indication information in the transmission instruction, then determines the number of TCI states as the number of TRPs used for transmission scheduling, determines the corresponding TRP according to the TCI state, and makes the TRP serve as the TRP used for transmission scheduling.

In the embodiments of the present application, the network device may set the RV indication information in various manners which include but are not limited to the following several manners.

Setting manner 1: the network device determines one or more RVs used by the transmission scheduling mode and puts the determined one or more RVs in the RV indication information, namely, the RV indication information contains the one or more RVs.

Therefore, the terminal device may determine the number of RVs used for transmission scheduling according to the number of RVs in the RV indication information after receiving the RV indication information in the transmission instruction and make the one or more RVs serve as one or more RVs used for transmission scheduling.

Setting manner 2: the network device determines the RV identification code to which the RV used by the transmission scheduling mode corresponds according to the preset mapping relationship between RV identification codes and RVs and puts the RV identification code in the RV indication information. Namely, the RV indication information contains the RV identification code.

Therefore, the terminal device may determine the RV to which the RV identification code corresponds and the number of RVs according to the RV identification code in the RV indication information and a preset mapping relationship between RV identification codes and RVs of the terminal device after receiving the RV indication information in the transmission instruction, then determines the number of RVs as the number of RVs used for transmission scheduling and makes the RV serve as the RV used for transmission scheduling.

Setting manner 3: the network device determines RV offset information to which the RV used by the transmission scheduling mode corresponds according to a preset RV offset function and puts the RV offset information and the RV in the RV indication information, wherein the RV offset function in the embodiments of the present application may be a function for calculating the RV through an offset value. Namely, the RV indication information contains the RV offset information and the RV.

Furthermore, in the embodiments of the present application, the network side device may determine the RV offset information in the following manner.

The network device determines effectiveness of the offset information needing to be sent to the terminal device.

If the network device determines that the offset information is ineffective, the network device determines the offset information in an ineffective range.

If the network device determines that the offset information is effective, the network device determines the offset information in an effective range.

In one embodiment, A function, preset by the network device, for calculating the RV through an offset value is Formula 1:

$$RV2 = \mathrm{mod}(RV1 + RV\_offset, 4) \qquad \text{Formula 1.}$$

RV1 in Formula 1 is an RV determined by the network device, used for transmission scheduling and notified to the terminal device, RV_offset in Formula 1 represents the offset information, RV2 in Formula 1 represents another RV used for transmission scheduling and determined according to RV1 and Formula 1 when RV_offset is effectively configured.

For example, an effective range of RV_offset in Formula 1 is 0-3, if the network device determines the number of RVs used for transmission scheduling as one, the network device can send one RV and one piece of ineffective RV offset information to the terminal device, for example, the network device determines that the RV sent to the terminal device is RV 1 and the ineffective RV offset information is −1, and the RV 1 and the RV offset information may be put in the RV indication information.

Therefore, the terminal device may determine the RV used for transmission scheduling as RV 1 according to the RV indication information in the transmission instruction after receiving the transmission instruction, meanwhile, determine that the RV offset information is ineffective according to the RV offset information in the RV indication information and the preset RV offset function so the terminal device can determine the number of RVs used for transmission scheduling as one and make the RV 1 serve as the RV used for transmission scheduling.

For another example, the effective range of RV_offset in Formula 1 is 0-3, if the network device determines the number of RVs used for transmission scheduling as two, the network device can send one RV and one piece of effective RV offset information to the terminal device, for example, the network device determines that the RV sent to the terminal device is RV 1 and the effective RV offset information is 1, and the RV 1 and the RV offset information may be put in the RV indication information.

Therefore, the terminal device may determine the RV used for transmission scheduling as RV 1 according to the RV indication information in the transmission instruction after receiving the transmission instruction, meanwhile, determine that the RV offset information is effective according to the RV offset information in the RV indication information and the preset RV offset function, and work out another RV used for transmission scheduling as RV 2 according to Formula 1. Therefore, the terminal device may determine the number of RVs used for transmission scheduling as two and make the RV 1 and RV 2 serve as the RVs used for transmission scheduling.

Through the above method, in the embodiment of the present application, various solutions are provided for notifying the transmission scheduling mode, wherein the network device notifies the terminal device of the transmission scheduling mode by using the manner of the RV identification code and/or the TRP identification code carried in the transmission instruction, the number of resources occupied by the transmission instruction is effectively decreased, and system overhead is reduced.

It needs to be noted that the preset mapping relationship between RV identification codes and RVs, the preset mapping relationship between TCI identification codes and TCI states and the RV offset function may be stored in the local of the network device and/or the local of the terminal device or stored in a third-party storage device which the network device and the terminal device can access.

Furthermore, the terminal device determines the transmission scheduling mode according to the transmission instruction after receiving the transmission instruction sent by the network device and performs transmission scheduling in the determined transmission scheduling mode.

The terminal device determines the TRP and the number of TRPs (namely, a value of the TRP and the number of TRPs) mainly according to the TRP indication information in the transmission scheduling mode and determines the RV and the number of RVs (namely, a value of the RV and the number of RVs) mainly according to the RV indication information in the transmission scheduling mode.

For example, the mapping relationship between TCI identification codes and TCI states is shown in Table 1, and the mapping relationship between RV identification codes and RVs is shown in Table 2. If the TRP indication information in the transmission instruction contains one TCI state, the RV indication information contains one RV identification code, wherein the TCI state is TCI state 1 and the RV identification code is 5.

Therefore, the terminal device may determine the RV to which the RV identification code contained in the RV indication information corresponds according to the preset mapping relationship between RV identification codes and RVs of the terminal device after receiving the transmission instruction.

It may be known from Table 2 that when the RV identification code is 5, there are two corresponding RVs, namely RV 0 and RV 1 respectively, and the terminal device determines the corresponding TRP as TRP 1 according to the TCI state 1. Therefore, the terminal device determines the transmission scheduling mode as single-TRP multi-RV transmission, makes TRP 1 serve as the TRP used for transmission scheduling and makes RV 0 and RV 1 serve as the RVs used for transmission scheduling.

TABLE 1

Mapping relationship between TCI identification codes and TCI states

| TCI identification code | TCI state |
|---|---|
| 0 | TCI state#0 |
| 1 | TCI state#1 |
| ... | ... |
| 6 | TCI state#0, TCI state#2 |
| 7 | TCI state#1, TCI state#3 |

TABLE 2

Mapping relationship between RV identification codes and RVs

| RV identification code | First RV | Second RV |
|---|---|---|
| 0 | 0 | NAN |
| 1 | 1 | NAN |
| 2 | 2 | NAN |
| 3 | 3 | NAN |
| 4 | 0 | 0 |
| 5 | 0 | 1 |
| 6 | 0 | 2 |
| 7 | 0 | 3 |
| 8 | 1 | 0 |
| 9 | 2 | 0 |
| 10 | 3 | 0 |
| 11 | 3 | 3 |
| ... | ... | ... |

For another example, the mapping relationship between TCI identification codes and TCI states is shown in Table 1, and the mapping relationship between RV identification codes and RVs is shown in Table 2. If the TRP indication information in the transmission instruction contains one TCI identification code, the RV indication information contains one RV identification code, wherein the TCI identification code is 6 and the RV identification code is 7.

Therefore, the terminal device may determine the RV to which the RV identification code contained in the RV indication information corresponds according to the preset mapping relationship between RV identification codes and RVs of the terminal device after receiving the transmission instruction, determine the TCI state to which the TCI identification code contained in the TRP indication information corresponds according to the preset mapping relationship between TCI identification codes and TCI states of the terminal device, and determine the corresponding TRP according to the TCI state.

As for the terminal device, it may be known from Table 1 that when the TCI identification code is 6, there are two corresponding TCI states, namely, TCI state #0 and TCI state #2 respectively, a TRP to which TCI state #0 corresponds is TRP 0, and a TRP to which TCI state #2 corresponds is TRP 2; and it may be known form Table 2 that when the RV identification code is 7, there are two corresponding RVs, namely, RV 0 and RV 3 respectively. Therefore, the terminal device determines the transmission scheduling mode as multi-TRP multi-RV transmission, makes TRP 0 and TRP 2 serve as the TRPs used for transmission scheduling and makes RV 0 and RV 3 serve as the RVs used for transmission scheduling.

Through the above method, in the embodiments of the present application, a manner for determining multi-TRP multi-RV transmission scheduling in the transmission scheduling process is provided, which is higher in applicability.

Furthermore, the embodiment of the present application provides a solution for adjusting the transmission scheduling mode in time according to different cases.

In one embodiment, the network device determines the new transmission scheduling mode after determining that the current transmission scheduling mode meets the adjustment condition and sends the adjusted transmission instruction to the terminal device, then the terminal device determines the new transmission scheduling mode according to the received adjusted transmission instruction sent by the network device and performs transmission scheduling in the new transmission scheduling mode.

In the embodiments of the present application, the network device determines whether the current transmission scheduling mode meets the adjustment condition in various manners which specifically include but are not limited to the following several manners.

Manner 1: the network device determines whether the current transmission scheduling mode meets the adjustment condition according to transmission quality fed back by the terminal device, wherein the terminal device can periodically feed current transmission quality back to the network device during transmission scheduling or feed the current transmission quality back to the network device after receiving a feedback instruction sent by the network device.

In one embodiment, if the transmission quality received by the network device and fed back by the terminal device during transmission scheduling is smaller than a first threshold value or larger than a second threshold value, the network device determines that the current transmission scheduling mode meets the adjustment condition, wherein the first threshold value is smaller than the second threshold value.

Manner 2: the network device determines whether the current transmission scheduling mode meets the adjustment condition according to the number of remaining resources of the system.

In one embodiment, if the network device determines that the current number of remaining resources of the system is smaller than a first resource threshold value or larger than a second resource threshold value, the network device determines that the current transmission scheduling mode meets the adjustment condition, wherein the first resource threshold value is smaller than the second resource threshold value.

Manner 3: the network device determines whether the current transmission scheduling mode meets the adjustment condition according a current service requirement.

In one embodiment, if a service needing to be executed by the network device needs to be transmitted in a first transmission scheduling mode, a current transmission scheduling mode is a second transmission scheduling mode, and then it is certain that the adjustment condition is met.

Furthermore, in the embodiments of the present application, the network device adjusts the number of RVs and/or the number of TRPs after determining that the adjustment condition is met, and determines the new transmission scheduling mode according to the adjusted number of RVs and/or the adjusted number of TRPs.

Furthermore, in the embodiment of the present application, the case of manner 1 is selected for introducing how to adjust the number of RVs and/or the number of TRPs and determine the adjusted transmission instruction by the network device in detail. Manners of adjusting the number of RVs and/or the number of TRPs by the network device are different according to a size relation between the transmission quality and the first threshold value and/or the second threshold value, which is introduced respectively below.

Adjustment manner 1: the network device increases the number of RVs and/or the number of TRPs used for transmission scheduling if the network device determines that the received transmission quality fed back by the terminal device is smaller than the first threshold value.

That is, the lower the transmission quality is, the poorer current channel quality is, the more necessary the coding rate and a receiving rate are to be increased, so adjustment may be made by increasing the number of RVs and/or the number of TRPs.

Furthermore, if the number of RVs of transmission scheduling is increased, the network device determines the increased number of RVs and the current number of TRPs as the new transmission scheduling mode and puts adjusted RV indication information to which the adjusted number of RVs corresponds in the adjusted transmission instruction.

In one embodiment, if the number of TRPs of transmission scheduling is increased, the network device determines the increased number of TRPs and the current number of RVs as the new transmission scheduling mode and puts adjusted TRP indication information to which the adjusted number of TRPs corresponds in the adjusted transmission instruction.

In one embodiment, if the number of TRPs of transmission scheduling and the number of RVs of transmission scheduling are increased, the network device determines the increased number of TRPs and the increased number of RVs as the new transmission scheduling mode and puts the adjusted RV indication information to which the adjusted number of RVs corresponds and the adjusted TRP indication information to which the adjusted number of TRPs corresponds in the adjusted transmission instruction.

Adjustment manner 2: the network device decreases the number of RVs and/or the number of TRPs used for transmission scheduling if the network device determines that the transmission quality is higher than the second threshold value.

That is, the higher the transmission quality is, the better the current channel quality gets, thus adjustment may be made at the moment by decreasing the number of RVs and/or the number of TRPs from the perspective of saving the system resources.

Furthermore, if the number of RVs of transmission scheduling is decreased, the network device determines the decreased number of RVs and the current number of TRPs as the new transmission scheduling mode and puts adjusted RV indication information to which the adjusted number of RVs corresponds in the adjusted transmission instruction.

In one embodiment, if the number of TRPs of transmission scheduling is decreased, the network device determines the decreased number of TRPs and the current number of RVs as the new transmission scheduling mode and puts adjusted TRP indication information to which the adjusted number of TRPs corresponds in the adjusted transmission instruction.

Figure 4:
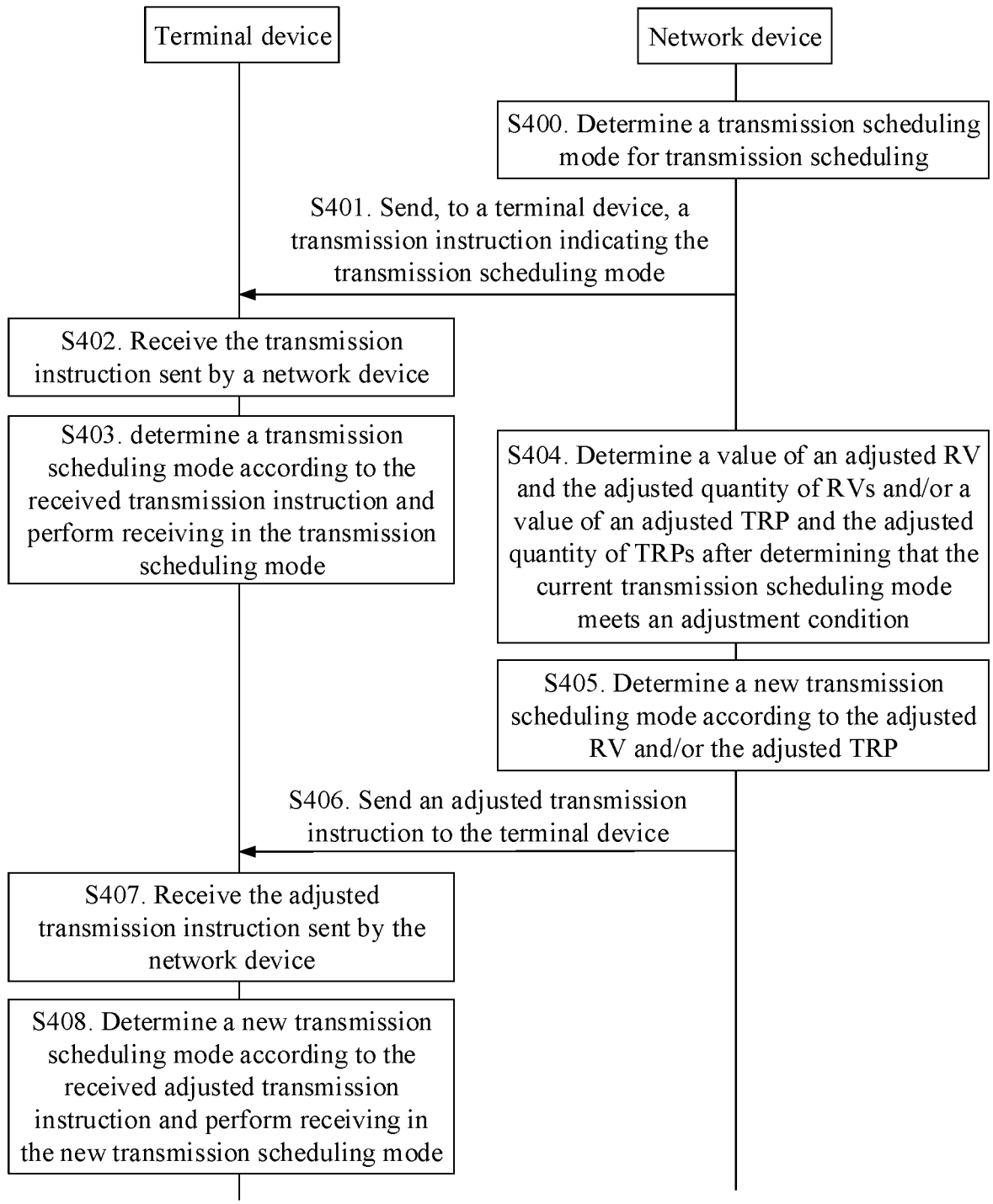
FIG. 4 is a schematic flowchart of transmission scheduling of an embodiment of the present application.

In one embodiment, if the number of TRPs of transmission scheduling and the number of RVs of transmission scheduling are decreased, the network device determines the decreased number of TRPs and the decreased number of RVs as the new transmission scheduling mode and puts the adjusted RV indication information to which the adjusted number of RVs corresponds and the adjusted TRP indication information to which the adjusted number of TRPs corresponds in the adjusted transmission instruction. Furthermore, a flow of transmission scheduling of the network device and the terminal device in the embodiment of the present application may be shown in FIG. 4, and its specific steps are as follows.

S400: The network device determines the transmission scheduling mode for transmission scheduling.

S401: The network device sends, to the terminal device, a transmission instruction used for indicating the transmission scheduling mode.

S402: The terminal device receives the transmission instruction sent by the network device.

S403: The terminal device determines the transmission scheduling mode according to the received transmission instruction sent by the network device and performs transmission scheduling in the determined transmission scheduling mode.

The terminal device determines a value of the TRP and the number of TRPs mainly according to the TRP indication information in the transmission scheduling mode and determines a value of the RV and the number of RVs mainly according to the RV indication information in the transmission scheduling mode.

S404: The network device determines a value of an adjusted RV and the adjusted number of RVs and/or a value of an adjusted TRP and the adjusted number of TRPs after determining that the current transmission scheduling mode meets the adjustment condition.

S405: The network device determines the new transmission scheduling mode according to the value of the adjusted RV and the adjusted number of RVs and/or the value of the adjusted TRP and the adjusted number of TRPs.

S406: The network device sends the adjusted transmission instruction to the terminal device.

S407: The terminal device receives the adjusted transmission instruction sent by the network device.

S408: The terminal device determines the new transmission scheduling mode according to the received adjusted transmission instruction sent by the network device and performs transmission scheduling in the new transmission scheduling mode.

It needs to be noted that the manners listed above are only examples, and which specific manner is adopted may be set by a user. In order to make embodiments of the present application clearer, the present application will be further described in detail below with reference to the drawings, and the described embodiments are only some but not all of the embodiments of the present application.

Figure 5:
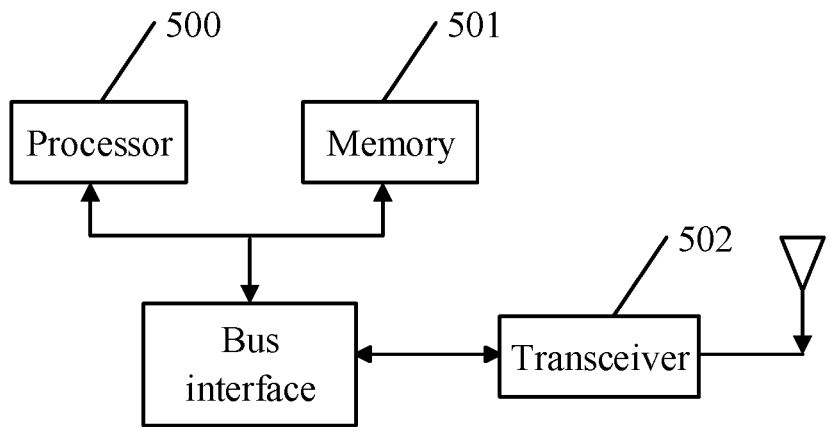
FIG. 5 is a schematic structural diagram of a terminal device of a first type of transmission scheduling of an embodiment of the present application.

As shown in FIG. 5, an embodiment of the present application provides a terminal device for transmission scheduling, including a processor 500, a memory 501 and a transceiver 502.

The processor 500 is in charge of managing a bus architecture and general processing. The memory 501 can store data used by the processor 500 when the processor 500 executes operations. The transceiver 502 is configured to receive and transmit data under control of the processor 500.

The bus architecture may include any number of interconnected buses and bridges, which specifically links various circuits of one or more processors represented by the processor 500 and memories represented by the memory 501. The bus architecture may further link various other circuits such as a peripheral device, a voltage stabilizer and a power management circuit, which are well known in the art and will, therefore, not be further described herein. A bus interface provides an interface. The processor 500 is in charge of managing the bus architecture and general processing. The memory 501 can store data used by the processor 500 when the processor 500 executes operations.

The flow disclosed in the embodiment of the present application may be applied to the processor 500 or realized by the processor 500. In an implementation process, all steps of a signal processing flow may be completed through an integrated logic circuit of hardware in the processor 500 or an instruction of a software form. The processor 500 may be a general-purpose processor, a digital signal processor, an application-specific integrated circuit, a field-programmable gate array or other programmable logic devices, a discrete gate or a transistor logic device and a discrete hardware component and can realize or execute each method, step and logic block diagram disclosed in the embodiment of the present application. The general-purpose processor may be a microprocessor or any conventional processor, etc. Steps of the method disclosed by the embodiment of the present application may be directly embodied to be executed and completed by a hardware processor, or by a combination of a hardware module and a software module in the processor. The software module may be located in a mature storage medium in the art such as a random access memory, a flash memory, a read-only memory, a programmable read-only memory or an electrically erasable programmable memory, a register. The storage medium is located in the memory 501. The processor 500 reads information in the memory 501 and completes steps of the signal processing flow in combination with its hardware.

In one embodiment, the processor 500 is configured to read a program in the memory 501 and execute: determining a transmission scheduling mode according to a received transmission instruction sent by a network device and performing transmission scheduling in the determined transmission scheduling mode, wherein the number of TRPs and/or the number of Panels in the transmission scheduling mode are/is determined according to TRP indication information in the transmission instruction, and the number of RVs in the transmission scheduling mode is determined according to RV indication information in the transmission instruction; determining a new transmission scheduling mode according to a received adjusted transmission instruction sent by the network device and performing transmission scheduling in the new transmission scheduling mode.

In one embodiment, the processor 500 determines the number of TRPs in the following manner: in a case that the TRP indication information in the transmission instruction contains a TCI state, determining the number of TCI states contained in the TRP indication information as the number of TRPs and/or the number of Panels for transmission scheduling; or in a case that the TRP indication information in the transmission instruction contains a TCI identification code, determining the number of TCI states to which the TCI identification code corresponds according to a preset mapping relationship between TCI identification codes and TCI states, and determining the number of TCI states to which the TCI identification code corresponds as the number of TRPs and/or the number of Panels for transmission scheduling.

Furthermore, the processor 500 is further configured to: determine a TRP to which the TCI state contained in the TRP indication information corresponds and determine the TRP as a TRP used for transmission scheduling; or determine the TRP to which the TCI state corresponds according to the TCI identification code contained in the TRP indication information; and determine the TRP as a TRP used for transmission scheduling.

In one embodiment, the processor 500 determines the number of RVs in the following manner: in a case that the RV indication information in the transmission instruction contains an RV, determining the number of RVs contained in the RV indication information as the number of RVs for transmission scheduling; or in a case that the RV indication information in the transmission instruction contains an RV identification code, determining the number of RVs to which the RV identification code corresponds according to a preset mapping relationship between RV identification codes and RVs, and determining the number of RVs to which the RV identification code corresponds as the number of RVs of transmission scheduling; or in a case that the RV indication information in the transmission instruction contains the RV and RV offset information, the terminal device determines the number of RVs according to the RV and the RV offset information and makes the determined number of RVs serve as the number of RVs of transmission scheduling.

Furthermore, the processor 500 is further configured to: determine an RV contained in the RV indication information and determine the RV as an RV used for transmission scheduling; or make an RV determined through an RV identification code contained in the RV indication information serve as an RV used for transmission scheduling.

In one embodiment, the processor 500 is further configured to: determine the number of effective RV offset information in the RV offset information contained in the transmission instruction according to an effective offset range; and determine a sum of the number of RVs and the number of effective RV offset information contained in the transmission instruction as the number of RVs for transmission scheduling.

In one embodiment, the processor 500 is further configured to: determine an RV according to the effective RV offset information; and determine the determined RV and the RV contained in the RV indication information as RVs used for transmission scheduling.

In one embodiment, the processor 500 is further configured to: determine the new number of TRPs and/or the new number of Panels according to TRP indication information in a reset transmission instruction in a case that the reset transmission instruction includes the TRP indication information, and determine the new transmission scheduling mode according to the new number of TRPs and/or the new number of Panels and the current number of RVs; or determine the new number of RVs according to RV indication information in the reset transmission instruction in a case that the reset transmission instruction includes RV indication information, and determine the new transmission scheduling mode according to the current number of TRPs and/or the current number of Panels and the new number of RVs; or determine the new number of RVs according to the RV indication information in the reset transmission instruction and determine the new number of TRPs and/or the new number of Panels according to the TRP indication information in the reset transmission instruction in a case that the reset transmission instruction includes the RV indication information and the TRP indication information, and determine the new transmission scheduling mode according to the new number of TRPs and/or the new number of Panels and the new number of RVs.

In one embodiment, the processor 500 is further configured to: feed transmission quality information back to the network device in the scheduling process to enable the network device to send the reset transmission instruction to the terminal device after determining that the received transmission quality information meets a resetting condition.

Figure 6:
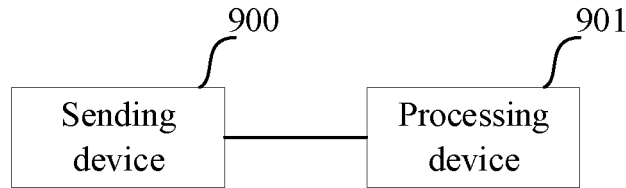
FIG. 6 is a schematic structural diagram of a terminal device of a second type of transmission scheduling of an embodiment of the present application.

As shown in FIG. 6, a terminal device for transmission scheduling includes: a determining device 600, configured to determine a transmission scheduling mode according to a received transmission instruction sent by a network device and perform transmission scheduling in the determined transmission scheduling mode, wherein the number of TRPs and/or the number of Panels in the transmission scheduling mode are/is determined according to TRP indication information in the transmission instruction, and the number of RVs in the transmission scheduling mode is determined according to the RV indication information in the transmission instruction; and a processing device 601, configured to determine a new transmission scheduling mode according to a received adjusted transmission instruction sent by the network device and perform transmission scheduling in the new transmission scheduling mode.

In one embodiment, the determining device 600 determines the number of TRPs in the following manner: in a case that the TRP indication information in the transmission instruction contains a TCI state, determining the number of TCI states contained in the TRP indication information as the number of TRPs and/or the number of Panels of transmission scheduling; or in a case that the TRP indication information in the transmission instruction contains a TCI identification code, determining the number of TCI states to which the TCI identification code corresponds according to a preset mapping relationship between TCI identification codes and TCI states, and determining the number of TCI states to which the TCI identification code corresponds as the number of TRPs of transmission scheduling.

Furthermore, the processing device 601 is further configured to: determine a TRP to which the TCI state contained in the TRP indication information corresponds and determine the TRP as a TRP used for transmission scheduling; or determine the TRP to which the TCI state corresponds according to the TCI identification code contained in the TRP indication information; and determine the TRP as the TRP used for transmission scheduling.

In one embodiment, the determining device 600 determines the number of RVs in the following manner: in a case that the RV indication information in the transmission instruction contains an RV, determining the number of RVs contained in the RV indication information as the number of RVs of transmission scheduling; or in a case that the RV indication information in the transmission instruction contains an RV identification code, determining the number of RVs to which the RV identification code corresponds according to a preset mapping relationship between RV identification codes and RVs, and determining the number of RVs to which the RV identification code corresponds as the number of RVs of transmission scheduling; or in a case that the RV indication information in the transmission instruction contains the RV and RV offset information, the terminal device determines the number of RVs according to the RV and the RV offset information and makes the determined number of RVs serve as the number of RVs of transmission scheduling.

Furthermore, the determining device 600 is further configured to: determine an RV contained in the RV indication information and determine the RV as the RV used for transmission scheduling; or make the RV determined through the RV identification code contained in the RV indication information serve as the RV used for transmission scheduling.

In one embodiment, the determining device 600 is further configured to: determine the number of effective RV offset information in the RV offset information contained in the transmission instruction according to an effective offset range; and determine a sum of the number of RVs contained in the transmission instruction and the number of effective RV offset information as the number of RVs of transmission scheduling.

In one embodiment, the determining device 600 is further configured to: determine the RV according to the effective RV offset information; determine the determined RV and the RV contained in the RV indication information as the RVs used for transmission scheduling.

In one embodiment, the processing device 601 is further configured to: determine the new number of TRPs and/or the new number of Panels according to TRP indication information in a reset transmission instruction in a case that the reset transmission instruction includes the TRP indication information, and determine a new transmission scheduling mode according to the new number of TRPs and/or the new number Panels and the current number of RVs; or determine the new number of RVs according to RV indication information in the reset transmission instruction in a case that the reset transmission instruction includes the RV indication information, and determine the new transmission scheduling mode according to the current number of TRPs and/or the current number of Panels and the new number of RVs; or determine the new number of RVs according to the RV indication information in the reset transmission instruction and determine the new number of TRPs and/or the new number of Panels according to the TRP indication information in the reset transmission instruction in a case that the reset transmission instruction includes the RV indication information and the TRP indication information, and determine the new number of TRPs and/or the new number of Panels and the new number of RVs as the new transmission scheduling mode.

In one embodiment, the processing device 601 is further configured to: feed transmission quality information back to the network device in a scheduling process so that the network device can send the reset transmission instruction to the terminal device after determining that the received transmission quality information meets a resetting condition.

Based on the same inventive concept, an embodiment of the present application further provides a method for transmission scheduling of a terminal device. As the method corresponds to the terminal device for transmission scheduling described in the embodiment of the present application, and a principle of solving the problems of the method is similar to that of the terminal device, implementation of the method can refer to implementation of the terminal device of the embodiment of the present application, and repetitions are omitted herein.

Figure 7:
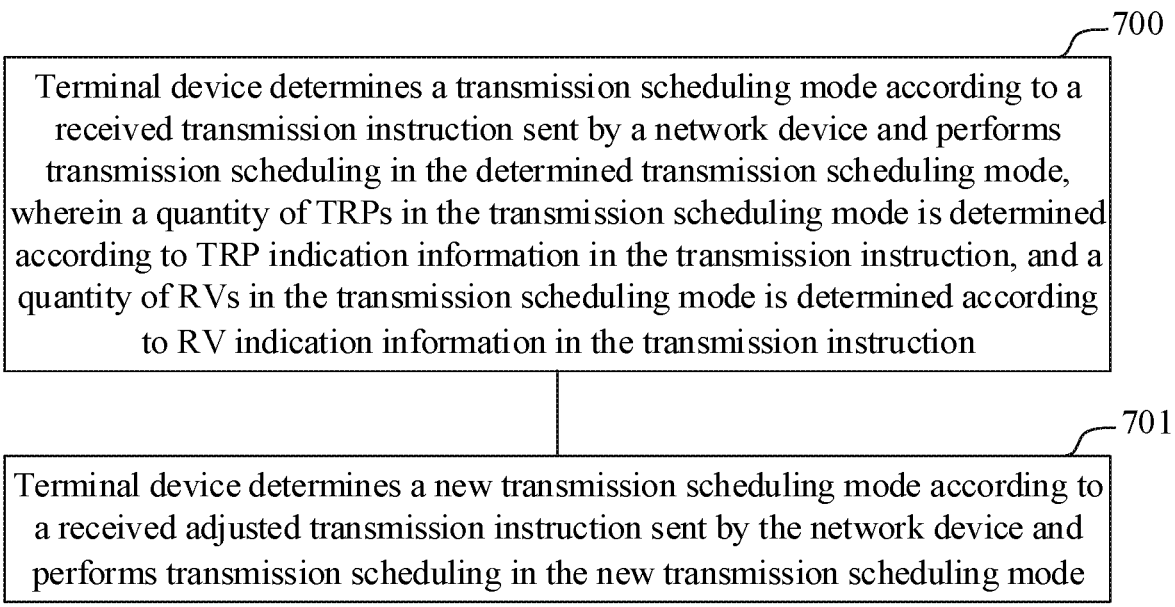
FIG. 7 is a schematic diagram of a method for transmission scheduling by a terminal device of an embodiment of the present application.

As shown in FIG. 7, an embodiment of the present application further provides a method for transmission scheduling of a terminal device, including: Step 700, the terminal device determines a transmission scheduling mode according to a received transmission instruction sent by a network device and performs transmission scheduling in the determined transmission scheduling mode, wherein the number of TRPs and/or the number of Panels in the transmission scheduling mode are/is determined according to TRP indication information in the transmission instruction, and the number of RVs in the transmission scheduling mode is determined according to RV indication information in the transmission instruction.

Step 701, the terminal device determines a new transmission scheduling mode according to a received adjusted transmission instruction sent by the network device and performs transmission scheduling in the new transmission scheduling mode.

In one embodiment, the terminal device determines the number of TRPs and/or the number of Panels in the following manner: in a case that the TRP indication information in the transmission instruction contains a TCI state, the terminal device determines the number of TCI states contained in the TRP indication information as the number of TRPs and/or the number of Panels for transmission scheduling; or in a case that the TRP indication information in the transmission instruction contains a TCI identification code, the terminal device determines the number of TCI states to which the TCI identification code corresponds according to a preset mapping relationship between TCI identification codes and TCI states of the terminal device, and determines the number of TCI states to which the TCI identification code corresponds as the number of TRPs and/or the number of Panels for transmission scheduling.

In one embodiment, the method further includes: the terminal device determines a TRP to which the TCI state contained in the TRP indication information corresponds and determines the TRP as a TRP used for transmission scheduling; or the terminal device determines the TRP to which the TCI state corresponds according to the TCI identification code contained in the TRP indication information, and determines the TRP as the TRP used for transmission scheduling.

In one embodiment, the terminal device determines the number of RVs in the following manner: in a case that the RV indication information in the transmission instruction contains an RV, the terminal device determines the number of RVs contained in the RV indication information as the number of RVs of transmission scheduling; or in a case that the RV indication information in the transmission instruction contains an RV identification code, the terminal device determines the number of RVs to which the RV identification code corresponds according to a preset mapping relationship between RV identification codes and RVs, and determines the number of RVs to which the RV identification code corresponds as the number of RVs of transmission scheduling; or in a case that the RV indication information in the transmission instruction contains the RV and RV offset information, the terminal device determines the number of RVs according to the RV and the RV offset information, and makes the determined number of RVs serve as the number of RVs of transmission scheduling.

In one embodiment, the method further includes: the terminal device determines the RV contained in the RV indication information and determines the RV as the RV used for transmission scheduling; or the terminal device makes the RV determined through the RV identification code contained in the RV indication information serve as the RV used for transmission scheduling.

In one embodiment, determining, by the terminal device, the number of RVs for transmission scheduling according to the RV and the RV offset information contained in the transmission instruction, includes: the terminal device determines the number of effective RV offset information in the RV offset information contained in the transmission instruction according to an effective offset range; and the terminal device determines a sum of the number of RVs and the number of effective RV offset information contained in the transmission instruction as the number of RVs for transmission scheduling.

In one embodiment, the method further includes: the terminal device determines an RV according to the effective RV offset information; and the terminal device determines the determined RV and the RV contained in the RV indication information as RVs used for transmission scheduling.

In one embodiment, determining, by the terminal device, the new transmission scheduling mode according to a received reset transmission instruction sent by the network device, includes: in a case that the reset transmission instruction includes TRP indication information, the terminal device determines the new number of TRPs and/or the new number of Panels according to the TRP indication information in the reset transmission instruction, and determines the new transmission scheduling mode according to the new number of TRPs and/or the new number of Panels and the current number of RVs; or in a case that the reset transmission instruction includes RV indication information, the terminal device determines the new number of RVs according to the RV indication information in the reset transmission instruction, and determines the new transmission scheduling mode according to the current number of TRPs and/or the current number of Panels and the new number of RVs; or in a case that the reset transmission instruction includes the RV indication information and the TRP indication information, the terminal device determines the new number of RVs according to the RV indication information in the reset transmission instruction, determines the new number of TRPs and/or the new number of Panels according to the TRP indication information in the reset transmission instruction, and determines the new transmission scheduling mode according to the new number of TRPs and/or the new number of Panels and the new number of RVs.

In one embodiment, before terminal device determines the new transmission scheduling mode according to the received reset transmission instruction sent by the network device, the method further includes: the terminal device feeds transmission quality information back to the network device in a scheduling process to enable the network device to send the reset transmission instruction to the terminal device after determining that the received transmission quality information meets a resetting condition.

Figure 8:
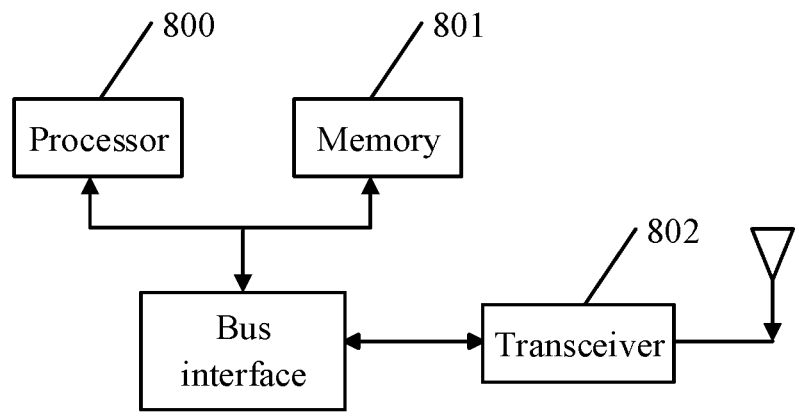
FIG. 8 is a schematic structural diagram of a network device of a first type of transmission scheduling of an embodiment of the present application.

As shown in FIG. 8, an embodiment of the present application provides a network device for transmission scheduling, including a processor 800, a memory 801 and a transceiver 802.

The processor 800 is in charge of managing a bus architecture and general processing. The memory 801 can store data used by the processor 800 when the processor 800 executes operations. The transceiver 802 is configured to receive and transmit data under control of the processor 800.

The bus architecture may include any number of interconnected buses and bridges, which specifically links various circuits of one or more processors represented by the processor 800 and memories represented by the memory 801. The bus architecture may further link various other circuits such as a peripheral device, a voltage stabilizer and a power management circuit, which are well known in the art and will, therefore, not be further described herein. A bus interface provides an interface. The processor 800 is in charge of managing the bus architecture and general processing. The memory 801 can store data used by the processor 800 when the processor 800 executes operations.

The flow disclosed in the embodiment of the present application may be applied to the processor 800 or realized by the processor 800 in an implementation process, all steps of a signal processing flow may be completed through an integrated logic circuit of hardware in the processor 800 or an instruction of a software form. The processor 800 may be a general-purpose processor, a digital signal processor, an application-specific integrated circuit, a field-programmable gate array or other programmable logic devices, a discrete gate or a transistor logic device and a discrete hardware component and can realize or execute each method, step and logic block diagram disclosed in the embodiment of the present application. The general-purpose processor may be a microprocessor or any conventional processor, etc. Steps of the method disclosed by the embodiment of the present application may be directly embodied to be executed and completed by a hardware processor, or by a combination of a hardware module and a software module in the processor. The software module may be located in a mature storage medium in the art such as a random access memory, a flash memory, a read-only memory, a programmable read-only memory or an electrically erasable programmable memory, a register. The storage medium is located in the memory 801. The processor 800 reads information in the memory 801 and completes steps of the signal processing flow in combination with its hardware.

In one embodiment, the processor 800 is configured to read programs in the memory 801 and execute: determining a transmission scheduling mode for transmission scheduling and sending, to a terminal device, a transmission instruction indicating the transmission scheduling mode, wherein the transmission instruction includes TRP indication information used for determining the number of TRPs and/or the number of Panels in the transmission scheduling mode and RV indication information used for determining the number of RVs in the transmission scheduling mode; determining a new transmission scheduling mode after determining that the current transmission scheduling mode meets an adjustment condition, and sending an adjusted transmission instruction to the terminal device so that the terminal device can determine the new transmission scheduling mode according to the adjusted transmission instruction and perform transmission scheduling in the new transmission scheduling mode.

In one embodiment, the processor 800 determines a TRP in the following manner: determining a TRP used by the transmission scheduling mode, and putting a TCI state to which the TRP corresponds in the TRP indication information; or determining a TCI identification code to which the TRP used by the transmission scheduling mode corresponds according to a preset mapping relationship between TCI identification codes and TCI states, and putting the TCI identification code in the TRP indication information.

In one embodiment, the processor 800 determines an RV in the following manner: determining an RV used by the transmission scheduling mode and putting the RV in the RV indication information; or determining an RV identification code to which the RV used by the transmission scheduling mode corresponds according to a preset mapping relationship between RV identification codes and RVs, and putting the RV identification code in the RV indication information; or determining RV offset information to which the RV used by the transmission scheduling mode corresponds according to a preset RV offset function and putting the RV offset information in the RV indication information.

In one embodiment, the processor 800 determines the RV offset information in the following manner: determining effectiveness of the RV offset information needing to be sent to the terminal device; determining the RV offset information in an ineffective range in a case that the RV offset information is ineffective; or determining the RV offset information in the effective range in a case that the RV offset information is effective.

In one embodiment, the processor 800 determines whether the current transmission scheduling mode meets the adjustment condition in the following manner: in a case that received transmission quality fed back by the terminal device during transmission scheduling is smaller than a first threshold value or larger than a second threshold value, determining that the current transmission scheduling mode meets the adjustment condition, wherein the first threshold value is smaller than the second threshold value.

In one embodiment, the processor 800 is specifically configured to: adjust the number of RVs and/or the number of TRPs after determining that the current transmission scheduling mode meets the adjustment condition; and determine the new transmission scheduling mode according to the adjusted number of RVs and/or the adjusted number of TRPs.

In one embodiment, the processor 800 is further configured to: increase the number of RVs and/or the number of TRPs of transmission scheduling in a case that that the transmission quality is lower than the first threshold value; or decrease the number of RVs and/or the number of TRPs of transmission scheduling in a case that the transmission quality is higher than the second threshold value.

In one embodiment, the processor 800 is further configured to: determine the new transmission scheduling mode according to the adjusted number of RVs and the current number of TRPs in a case that the number of RVs is adjusted; or determine the new transmission scheduling mode according to the adjusted number of TRPs and the current number of RVs in a case that the number of TRPs is adjusted; or determine the new transmission scheduling mode according to the adjusted number of TRPs and the adjusted number of RVs in a case that the number of TRPs and the number of RVs are adjusted.

In one embodiment, the processor 800 is specifically configured to: put adjusted RV indication information to which the adjusted number of RVs corresponds in the adjusted transmission instruction in a case that the number of RVs is adjusted; or put adjusted TRP indication information to which the adjusted number of TRPs corresponds in the adjusted transmission instruction in a case that the number of TRPs is adjusted; or put the adjusted RV indication information to which the adjusted number of RVs corresponds and the adjusted TRP indication information to which the adjusted number of TRPs corresponds in the adjusted transmission instruction in a case that the number of TRPs and the number of RVs are adjusted.

Figure 9:
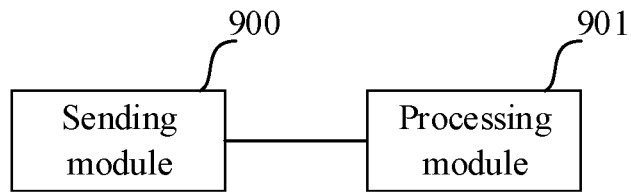
FIG. 9 is a schematic structural diagram of a network device of a second type of transmission scheduling of an embodiment of the present application.

As shown in FIG. 9, the present application provides a network device for transmission scheduling, including: a sending device 900, configured to determine a transmission scheduling mode for transmission scheduling and send, to a terminal device, a transmission instruction used for indicating the transmission scheduling mode, wherein the transmission instruction includes TRP indication information used for determining the number of TRPs and/or the number of Panels in the transmission scheduling mode and RV indication information used for determining the number of RVs in the transmission scheduling mode; and a processing device 901, configured to determine a new transmission scheduling mode after determining that the current transmission scheduling mode meets an adjustment condition, and send an adjusted transmission instruction to the terminal device to enable the terminal device to determine the new transmission scheduling mode according to the adjusted transmission instruction and perform transmission scheduling in the new transmission scheduling mode.

In one embodiment, the processing device 901 determines a TRP in the following manner: a TRP used by the transmission scheduling mode is determined, and a TCI state to which the TRP corresponds is put in the TRP indication information; or a TCI identification code to which the TRP used by the transmission scheduling mode corresponds is determined according to a preset mapping relationship between TCI identification codes and TCI states and is put in the TRP indication information.

In one embodiment, the processing device 901 determines an RV in the following manner: an RV used by the transmission scheduling mode is determined and put in the RV indication information; an RV identification code to which the RV used by the transmission scheduling mode corresponds is determined according to a preset mapping relationship between RV identification codes and RVs and is put in the RV indication information; or RV offset information to which the RV used by the transmission scheduling mode corresponds is determined according to a preset RV offset function and is put in the RV indication information.

In one embodiment, the processing device 901 determines the RV offset information in the following manner: effectiveness of the offset information needing to be sent to the terminal device is determined; the offset information is determined in the ineffective range if it is certain that the offset information is ineffective; or the offset information is determined in the effective range if it is certain that the offset information is effective.

In one embodiment, the processing device 901 determines whether the current transmission scheduling mode meets the adjustment condition in the following manner: in a case that received transmission quality fed back by the terminal device during transmission scheduling is smaller than a first threshold value or larger than a second threshold value, it is certain that the current transmission scheduling mode meets the adjustment condition, wherein the first threshold value is smaller than the second threshold value.

In one embodiment, the processing device 901 is further configured to: adjust the number of RVs and/or the number of TRPs after determining that the current transmission scheduling mode meets the adjustment condition; and determine the new transmission scheduling mode according to the adjusted number of RVs and/or the adjusted number of TRPs.

In one embodiment, the processing device 901 is further configured to: increase the number of RVs and/or the number of TRPs used for transmission scheduling in a case that transmission quality is lower than the first threshold value; or decrease the number of RVs and/or the number of TRPs used for transmission scheduling in a case that the transmission quality is higher than the second threshold value.

In one embodiment, the processing device 901 is further configured to: determine the new transmission scheduling mode according to the adjusted number of RVs and the current number of TRPs in a case that the number of RVs is adjusted; or determine the new transmission scheduling mode according to the adjusted number of TRPs and the current number of RVs in a case that the number of TRPs is adjusted; or determine the new transmission scheduling mode according to the adjusted number of TRPs and the adjusted number of RVs in a case that the number of TRPs and the number of RVs are adjusted.

In one embodiment, the processing device 901 is further configured to: put adjusted RV indication information to which the adjusted number of RVs corresponds in the adjusted transmission instruction in a case that the number of RVs is adjusted; or put adjusted TRP indication information to which the adjusted number of TRP corresponds in the adjusted transmission instruction in a case that the number of TRPs is adjusted; or put the adjusted RV indication information to which the adjusted number of RVs corresponds and the adjusted TRP indication information to which the adjusted number of TRPs corresponds in the adjusted transmission instruction in a case that the number of TRPs and the number of RVs are adjusted.

Based on the same inventive concept, an embodiment of the present application further provides a method for transmission scheduling of a network device. As the method corresponds to the network device for transmission scheduling introduced in the embodiment of the present application, and a principle of solving the problems of the method is similar to that of the network device, implementation of the method may refer to implementation of the network device in the embodiment of the present application, and repetitions are omitted herein.

Figure 10:
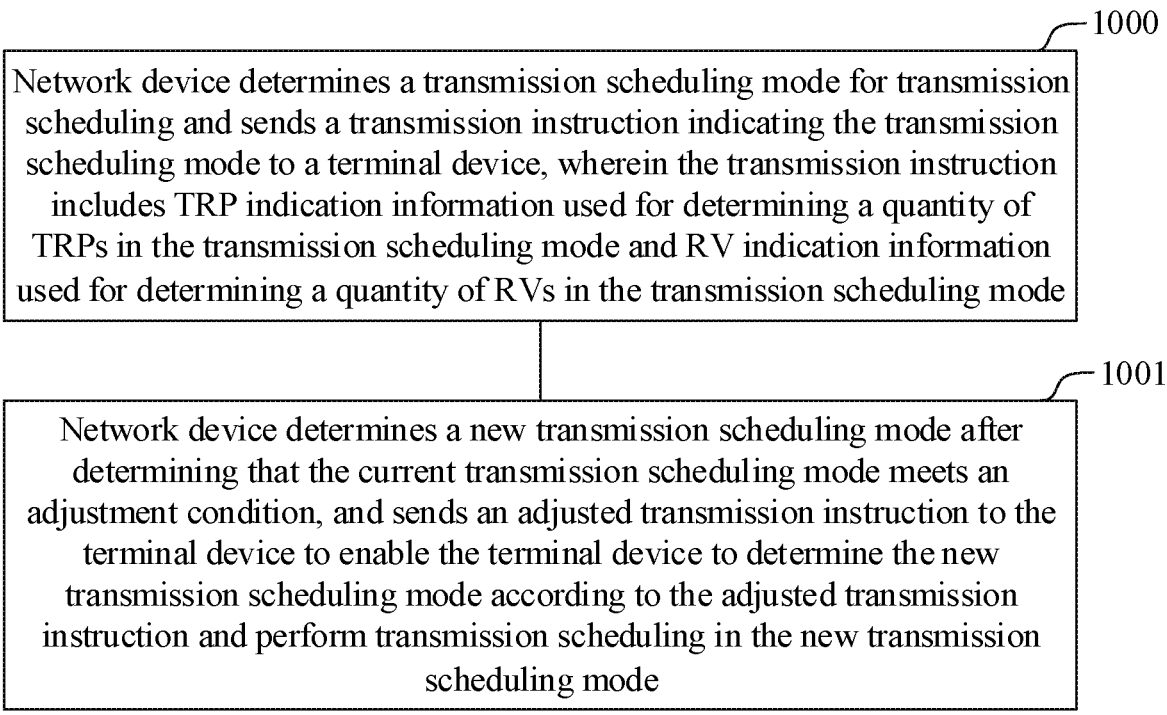
FIG. 10 is a schematic diagram of a method for transmission scheduling by a network device of an embodiment of the present application.

As shown in FIG. 10, an embodiment of the present application further provides a method for transmission scheduling of a network device, including: step 1000, the network device determines a transmission scheduling mode for transmission scheduling and sends, to a terminal device, a transmission instruction used for indicating the transmission scheduling mode, wherein the transmission instruction includes TRP indication information used for determining the number of TRPs and/or the number of Panels in the transmission scheduling mode and RV indication information used for determining the number of RVs in the transmission scheduling mode; and step 1001, the network device determines a new transmission scheduling mode after determining that the current transmission scheduling mode meets an adjustment condition and sends an adjusted transmission instruction to the terminal device so that the terminal device can determine the new transmission scheduling mode according to the adjusted transmission instruction and perform transmission scheduling in the new transmission scheduling mode.

In one embodiment, the network device determines a TRP in the following manner: the network device determines a TRP used by the transmission scheduling mode and puts a TCI state to which the TRP corresponds in the TRP indication information; or the network device determines a TCI identification code to which the TRP used by the transmission scheduling mode corresponds according to a preset mapping relationship between TCI identification codes and TCI states and puts the TCI identification code in the TRP indication information.

In one embodiment, the network device determines an RV in the following manner: the network device determines an RV used by the transmission scheduling mode and puts the RV in the RV indication information; or the network device determines an RV identification code to which the RV used by the transmission scheduling mode corresponds according to a preset mapping relationship between RV identification codes and RVs and puts the RV identification code in the RV indication information; or the network device determines RV offset information to which the RV used by the transmission scheduling mode corresponds according to a preset RV offset function and puts the RV offset information in the RV indication information.

In one embodiment, the network device determines the RV offset information in the following manner: the network device determines effectiveness of the offset information needing to be sent to the terminal device; determines the offset information in an ineffective range in a case that the offset information is ineffective; or determines the offset information in an effective range in a case that the offset information is effective.

In one embodiment, the network device determines whether the current transmission scheduling mode meets the adjustment condition in the following manner: in a case that transmission quality received by the network device and fed back by the terminal device during transmission scheduling is smaller than a first threshold value or larger than a second threshold value, it is certain that the current transmission scheduling mode meets the adjustment condition, wherein the first threshold value is smaller than the second threshold value.

In one embodiment, determining, by the network device, the new transmission scheduling mode after determining that the current transmission scheduling mode meets the adjustment condition, includes: the network device adjusts the number of RVs and/or the number of TRPs after determining that the current transmission scheduling mode meets the adjustment condition; and the network device determines the new transmission scheduling mode according to the adjusted number of RVs and/or the adjusted number of TRPs.

In one embodiment, adjusting, by the network device, the number of RVs and/or the number of TRPs, includes: the network device increases the number of RVs and/or the number of TRPs of transmission scheduling in a case that transmission quality is lower than the second threshold value; or the network device decreases the number of RVs and/or the number of TRPs of transmission scheduling in a case that the transmission quality is higher than the second threshold value.

In one embodiment, determining, by the network device, the new transmission scheduling mode according to the adjusted number of RVs and/or the adjusted number of TRPs, includes: the network device determines the new transmission scheduling mode according to the adjusted number of RVs and the current number of TRPs in a case that the number of RVs is adjusted; or the network device determines the new transmission scheduling mode according to the adjusted number of TRPs and the current number of RVs in a case that the number of TRPs is adjusted; or the network device determines the new transmission scheduling mode according to the adjusted number of TRPs and the adjusted number of RVs in a case that the number of TRPs and the number of RVs are adjusted.

In one embodiment, sending, by the network device, the adjusted transmission instruction to the terminal device, includes: the network device puts adjusted RV indication information to which the adjusted number of RVs corresponds in the adjusted transmission instruction in a case that the number of RVs is adjusted; or the network device puts adjusted TRP indication information to which the adjusted number of TRPs corresponds in the adjusted transmission instruction in a case that the number of TRPs is adjusted; or the adjusted RV indication information to which the adjusted number of RVs corresponds and the adjusted TRP indication information to which the adjusted number of TRPs corresponds are put in the adjusted transmission instruction in a case that the number of TRPs and the number of RVs are adjusted.

In some possible implementations, all aspects of the method for transmission scheduling provided by the embodiment of the present application may be also realized as a form of a program product which includes a program code, and when the program code runs on a computer device, the program code is used for making the computer device execute steps of the method for transmission scheduling described in the specification according to various exemplary implementations of the present application.

The program product may adopt any combination of one or more readable media. The readable medium may be a readable signal medium or a readable storage medium. The readable storage medium may be but not limited to, for example, an electric, magnetic, optical, electromagnetic, infrared or semi-conductor system, apparatus or device, or any combination of the above. More particular examples (but not an exhaustive list) of the readable storage medium include: an electric connection and portable disc with one or more conducting wires, a hard disk, a random access memory (RAM), a read-only memory (ROM), an erasable programmable read-only memory (EPROM or a flash memory), an optical fiber, a portable compact disc read-only memory (CD-ROM), an optical storage device, a magnetic storage device or any suitable combination of the above.

The program product for transmission scheduling according to the implementation of the present application may adopt the portable CD-ROM and include the program code and can run on a server device. However, the program product of the present application is not limited to this, in this document, the readable storage medium may be any tangible medium including or storing a program, and the program may be used by information transmission, an apparatus or a device or used in combination with them.

The readable signal medium may be a data signal transmitted in a baseband or as part of a carrier wave and carries a readable program code. The propagated data signal may be in various forms, including but not limited to an electro-magnetic signal, an optical signal or any suitable combination of the above. The readable signal medium may be any readable medium except for the readable storage medium, which can send, propagate or transmit a program for being used by a periodic network action system, an apparatus or a device or used in combination with them.

The program code contained in the readable medium may be transmitted through any suitable medium, including but not limited to a wireless, wired, optical cable and RF, etc. or any suitable combination of the above.

The program code for executing operations of the present application may be written through any combination of one or more programming languages which include an object-oriented programming language, such as Java, C++, etc., and also include a conventional procedural programming language, such as a "C" language or a similar programming language. The program code may be completely executed on a user computing device or partially executed on user equipment or executed as a standalone software package or executed partially on the user computing device and partially on a remote computing device or completely executed on the remote computing device or a server. In a case with the remote computing device involved, the remote computing device may be connected, through any type of networks including a local area network (LAN) or a wide area network (WAN), to the user computing device or to an external computing device.

An embodiment of the present application further provides a computing device readable storage medium for the method for transmission scheduling of the network device, namely, contents are not lost in outage. The storage medium stores a software program, including a program code, and when the program code runs on a computing device and the software program is read and executed by one or more processors, any above solution of the network device for transmission scheduling of the embodiment of the present application may be realized.

An embodiment of the present application further provides a computing device readable storage medium for the method for transmission scheduling of the terminal device, namely, contents are not lost in outage. The storage medium stores a software program, including a program code, and when the program code runs on a computing device and the software program is read and executed by one or more processors, any above solution of the terminal device for transmission scheduling of the embodiment of the present application may be realized.

In the embodiment provided by the present application, in order to realize all functions in the method provided by the embodiment of the present application, the device for transmission scheduling may include a hardware structure and/or software module, and realizes the above functions through the hardware structure or the software module or in a form of the hardware structure and the software module. Whether a certain function in all the functions is executed through the hardware structure or the software module or the form of the hardware structure and the software module depends on specific application and a design restraint condition of the solution.

The present application is described with reference to a block diagram and/or a flowchart showing a method, an apparatus (system) and/or a computer program product according to the embodiments of the present application. It should be understood that one block or a combination of blocks of the block diagram and/or flowchart may be realized through computer program instructions. These computer program instructions may be provided for a processor of a general-purpose computer or a special-purpose computer and/or other programmable data processing apparatuses to generate a machine, thus the instructions executed by the computer processor and/or other programmable data processing apparatuses establish a method for realizing functions/actions specified in the blocks of the block diagram and/or flowchart.

Correspondingly, the present application may be implemented through hardware and/or software (including firmware, resident software, a microcode, etc.). Furthermore, the present application may adopt a form of a computer program product on a computer applicable or computer readable storage medium, which has a computer applicable or computer readable program code realized in the medium for being used by an instruction executing system or used in combination with the instruction executing system. In the context of the present application, the computer applicable or computer readable medium may be any medium and may contain, store, communicate, transmit or deliver a program for being used by the instruction executing system, the apparatus or the device or used in combination with the instruction executing system, the apparatus or device.

What is claimed is:

1. A method for transmission scheduling, comprising:
   determining, by a terminal device, a transmission scheduling mode according to a received transmission instruction, and performing transmission scheduling in the transmission scheduling mode, wherein a quantity of transmission control information, TCI, states is determined according to transmission reception point (TRP) indication information, and redundancy versions (RVs) in the transmission scheduling mode are determined according to RV indication information;
   wherein the RVs in the transmission scheduling mode are determined according to the RV indication information, comprising:
   determining, by the terminal device, RVs corresponding to an RV identification code contained in the RV indication information as the RVs in the transmission scheduling mode.

2. The method according to claim 1, further comprising:
  determining, by the terminal device, a TRP corresponding to the TCI state contained in the TRP indication information, and determining the TRP as a TRP used for transmission scheduling; or
  determining, by the terminal device, a TRP corresponding to a TCI state according to the TCI identification code contained in the TRP indication information, and determining the TRP as a TRP used for transmission scheduling.

3. The method according to claim 1, further comprising:
  determining, by the terminal device, a quantity of RVs corresponding to the RV identification code contained in the RV indication information in the transmission instruction according to a preset mapping relationship between RV identification codes and RVs, and
  determining, by the terminal device, the quantity of RVs corresponding to the RV identification code as the quantity of RVs for transmission scheduling.

4. The method according to claim 1, further comprising:
  determining, by the terminal device, a new transmission scheduling mode according to a received adjusted transmission instruction, and performing transmission scheduling in the new transmission scheduling mode.

5. The method according to claim 1, wherein the determining, by the terminal device, RVs corresponding to an RV identification code contained in the RV indication information in the transmission instruction as the RVs in the transmission scheduling mode, comprises:
  determining, by the terminal device, the RVs corresponding to the RV identification code according to a preset mapping relationship between RV identification codes and RVs; and
  determining, by the terminal device, the RVs corresponding to the RV identification code as the RVs in the transmission scheduling mode.

6. A method for transmission scheduling, comprising:
  determining, by a network device, a transmission scheduling mode for transmission scheduling, and sending a transmission instruction indicating the transmission scheduling mode to a terminal device, wherein a quantity of transmission control information, TCI, states is determined according to transmission reception point (TRP) indication information, and redundancy versions (RVs) in the transmission scheduling mode are determined according to RV indication information;
  determining, by the network device, an RV identification code corresponding to the RVs in the transmission scheduling mode, and putting the RV identification code in the RV indication information.

7. The method according to claim 6, wherein network device determines a TRP in the following manner:
  determining a TRP used by the transmission scheduling mode, and puts a TCI state corresponding to the TRP in the TRP indication information; or
  determining a TCI identification code corresponding to a TRP used by the transmission scheduling mode according to a preset mapping relationship between TCI identification codes and TCI states, and puts the TCI identification code in the TRP indication information.

8. The method according to claim 6, further comprising:
  determining, by the network device, a new transmission scheduling mode after determining that the transmission scheduling mode meets an adjustment condition, and sending, by the network device, an adjusted transmission instruction to the terminal device to enable the terminal device to determine the new transmission scheduling mode according to the adjusted transmission instruction and perform transmission scheduling in the new transmission scheduling mode.

9. The method according to claim 6, wherein the determining, by the network device, the RV identification code corresponding to the RVs in the transmission scheduling mode, comprises:
  determining, by the network device, the RV identification code corresponding to the RVs in the transmission scheduling mode according to a preset mapping relationship between RV identification codes and RVs.

10. A terminal device for transmission scheduling, comprising: a processor and a memory, wherein
  the processor is configured to read programs in the memory and execute:
  determining a transmission scheduling mode according to a received transmission instruction and performing transmission scheduling in the transmission scheduling mode, wherein a quantity of transmission control information, TCI, states is determined according to transmission reception point TRP) indication information, and redundancy versions (RVs) in the transmission scheduling mode are determined according to RV indication information;
  wherein the RVs in the transmission scheduling mode are determined according to the RV indication information, comprising:
  determining RVs corresponding to an RV identification code contained in the RV indication information as the RVs in the transmission scheduling mode.

11. The terminal device according to claim 10, wherein the processor is further configured to:
  determine the RVs corresponding to the RV identification code according to a preset mapping relationship between RV identification codes and RVs, and
  determine the RVs corresponding to the RV identification code as the quantity of RVs for transmission scheduling.

12. The terminal device according to claim 10, wherein the processor is further configured to:
  determine the RVs corresponding to the RV identification code according to a preset mapping relationship between RV identification codes and RVs; and
  determine the RVs corresponding to the RV identification code as the RVs in the transmission scheduling mode.

13. A network device for transmission scheduling, comprising: a processor and a memory, wherein
  the processor is configured to read programs in the memory and execute the method of claim 6.

14. The network device according to claim 13, wherein the processor is further configured to:
  determine an RV identification code corresponding to an RV used by the transmission scheduling mode according to a preset mapping relationship between RV identification codes and RVs.

15. The network device according to claim 13, wherein the processor is further configured to:
  determine a TRP used by the transmission scheduling mode, and putting a TCI state corresponding to the TRP in the TRP indication information; or
  determine a TCI identification code corresponding to a TRP used by the transmission scheduling mode according to a preset mapping relationship between TCI identification codes and TCI states, and putting the TCI identification code in the TRP indication information.

* * * * *